United States Patent
Sutou et al.

(10) Patent No.: US 7,627,664 B2
(45) Date of Patent: Dec. 1, 2009

(54) METHOD AND APPARATUS FOR REMOTELY CONTROLLING A TERMINAL BY A CONTROL TERMINAL AND STORING CONTROL HISTORY INFORMATION AT THE TERMINAL BEING REMOTELY CONTROLLED

(75) Inventors: Hiromi Sutou, Yokohama (JP); Tsutomu Kontani, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 854 days.

(21) Appl. No.: 09/811,403

(22) Filed: Mar. 20, 2001

(65) Prior Publication Data

US 2002/0035627 A1     Mar. 21, 2002

(30) Foreign Application Priority Data

Sep. 20, 2000    (JP) ............................. 2000-290352

(51) Int. Cl.
*G06F 15/16*     (2006.01)

(52) U.S. Cl. ................. 709/224; 709/203; 709/217; 709/218; 709/219

(58) Field of Classification Search ................. 709/224, 709/203, 217–219
See application file for complete search history.

(56) References Cited

U.S. PATENT DOCUMENTS

| | | | |
|---|---|---|---|
| 4,803,348 A * | 2/1989 | Lohrey et al. ............... 235/381 |
| 4,891,743 A * | 1/1990 | May et al. ....................... 363/87 |
| 4,942,552 A * | 7/1990 | Merrill et al. .................... 710/6 |
| 5,379,409 A | 1/1995 | Ishikawa |
| 5,491,780 A * | 2/1996 | Fyles et al. .................... 715/733 |
| 5,675,510 A * | 10/1997 | Coffey et al. ................. 709/224 |
| 5,732,212 A * | 3/1998 | Perholtz et al. ............. 709/224 |
| 5,790,798 A | 8/1998 | Beckett, II et al. |
| 5,884,096 A * | 3/1999 | Beasley et al. .................. 710/38 |
| 5,941,996 A | 8/1999 | Smith et al. |
| 5,964,839 A * | 10/1999 | Johnson et al. .............. 709/224 |
| 5,982,392 A * | 11/1999 | Anfossi et al. ............... 345/502 |
| 6,006,171 A * | 12/1999 | Vines et al. .................. 702/184 |
| 6,128,009 A * | 10/2000 | Ohkura et al. ................. 725/46 |
| 6,173,325 B1 * | 1/2001 | Kukreja ....................... 709/224 |
| 6,300,863 B1 * | 10/2001 | Cotichini et al. ............. 340/5.8 |
| 6,381,632 B1 * | 4/2002 | Lowell ........................ 709/203 |
| 6,671,724 B1 * | 12/2003 | Pandya et al. ............... 709/226 |
| 6,708,211 B1 * | 3/2004 | Tingley et al. .............. 709/224 |
| 6,708,215 B1 * | 3/2004 | Hingorani et al. ........... 709/229 |
| 6,721,685 B2 * | 4/2004 | Kodama ....................... 702/184 |
| 6,772,107 B1 * | 8/2004 | La Cascia et al. ............. 703/21 |
| 6,829,639 B1 * | 12/2004 | Lawson et al. .............. 709/224 |
| 6,842,782 B1 * | 1/2005 | Malik et al. .................. 709/224 |

(Continued)

FOREIGN PATENT DOCUMENTS

EP    0472839    3/1992

(Continued)

*Primary Examiner*—Alina N. Boutah
(74) *Attorney, Agent, or Firm*—Brundidge & Stanger, P.C.

(57) ABSTRACT

A terminal to be remote controlled via a communication network is provided with a communication controller 26A for receiving a remote operation message from a control terminal, a remote operation basic controller 20A for delivering remote operation input data extracted from the received message to an operating system, and an operation recording and playing controller 25A for recording and playing the remote operation input data and specific terminal operation data as remote operation history data.

54 Claims, 17 Drawing Sheets

U.S. PATENT DOCUMENTS

| | | |
|---|---|---|
| 6,917,981 B1 * | 7/2005 | Buck et al. .................. 709/230 |
| 6,970,924 B1 * | 11/2005 | Chu et al. ................... 709/224 |
| 6,978,303 B1 * | 12/2005 | McCreesh et al. ........... 709/224 |
| 7,076,504 B1 * | 7/2006 | Handel et al. ............ 707/104.1 |
| 2002/0026505 A1 * | 2/2002 | Terry .......................... 709/221 |
| 2002/0035627 A1 * | 3/2002 | Sutou et al. ................. 709/224 |
| 2002/0091850 A1 * | 7/2002 | Perholtz et al. ............. 709/231 |
| 2004/0117478 A1 * | 6/2004 | Triulzi et al. ................ 709/224 |
| 2004/0249938 A1 * | 12/2004 | Bunch ........................ 709/224 |

FOREIGN PATENT DOCUMENTS

| | | |
|---|---|---|
| GB | 2296114 | 6/1996 |
| JP | 3276342 | 12/1991 |
| JP | 667956 | 3/1994 |
| JP | 8235093 | 9/1996 |
| JP | 1185697 | 3/1999 |
| JP | 11213009 | 8/1999 |
| WO | 9913423 | 3/1999 |

* cited by examiner

FIG. 2
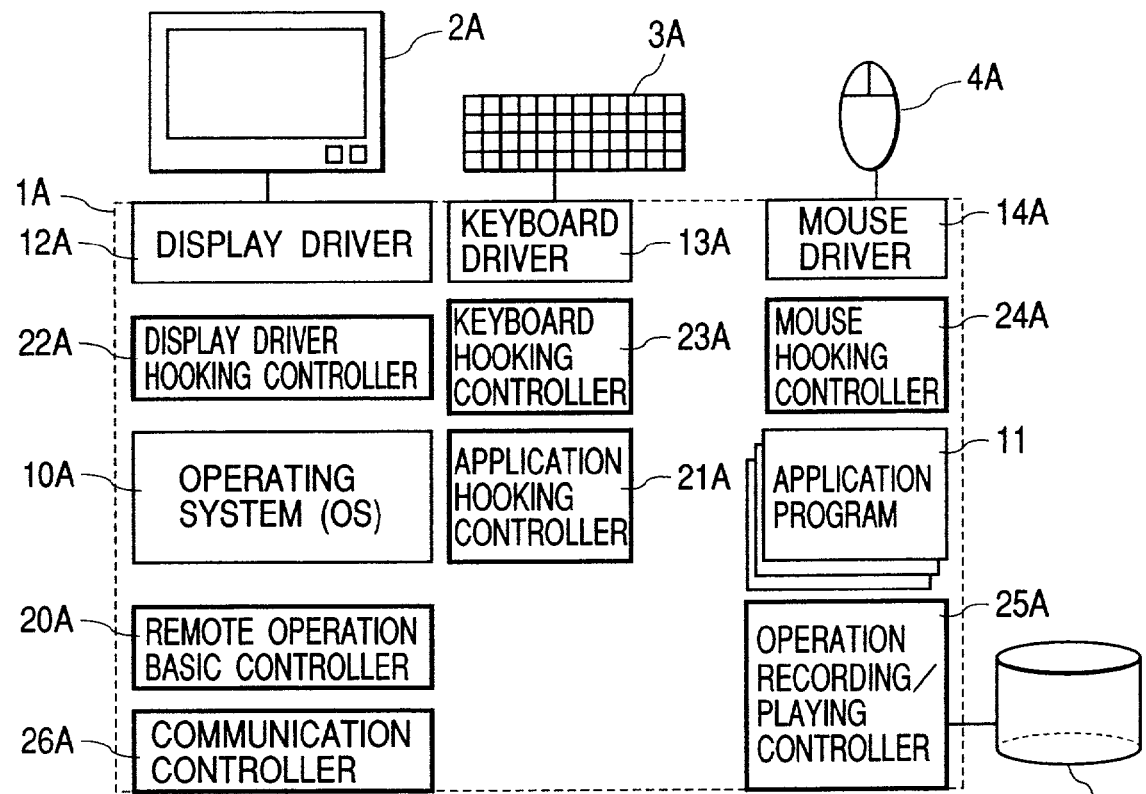
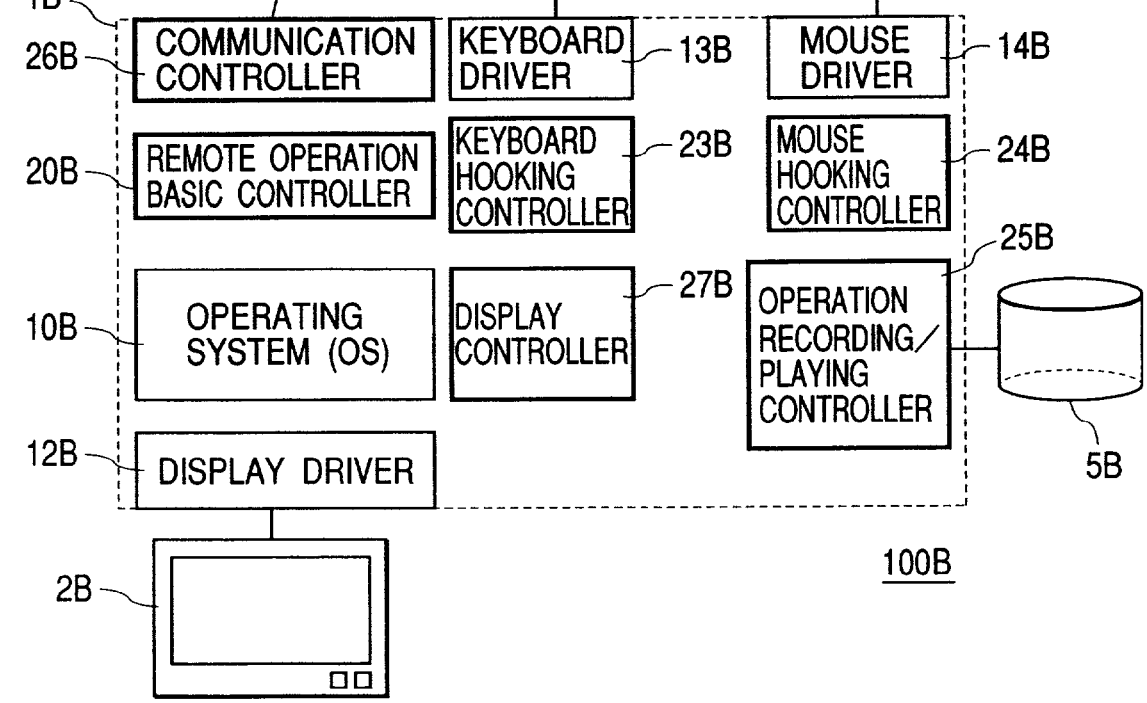

FIG. 9

| TIME (hh. mm. ss) 51 | SOURCE OF EVENT 52 | CONTENS OF EVENT 53 | DETAIL OF EVENT 54 | OBJECT APPLICATION 55 | NAME OF TERMINAL 56 |
|---|---|---|---|---|---|
| 10:30:25 | MOUSE | LEFT CLICK | | FILE MANAGER | TERMINAL-A |
| 10:30:26 | APPLICATION | START | WORD PROCESSOR SOFTWARE | WORD PROCESSOR SOFTWARE | |
| 10:30:26 | DISPLAY | BITMAP DRAWING | BITMAP INFORMATION | WORD PROCESSOR SOFTWARE | |
| 10:31:10 | KEYBOARD | TEST INPUT | | WORD PROCESSOR SOFTWARE | TERMINAL-A |
| 10:31:10 | DISPLAY | TEST DRAWING | BITMAP INFORMATION | WORD PROCESSOR SOFTWARE | |
| 10:40:30 | APPLICATION | DISCONNECTION | CONTROL TERMINAL-A | REMOTE CONTROLLER | TERMINAL-A |

| NUMBER | SOURCE OF EVENT | CONTENTS OF EVENT | OBJECT APPLICATION | NAME OF TERMINAL |
|---|---|---|---|---|
| 1 | APPLICATION | TERMINAL CONNECTED TO CONTROLLER | REMOTE CONTROLLER | TERMINAL-A |
| 2 | KEYBOARD | INPUT OF "Ctrl+ATL+DEL" | LOG-ON MANAGER | TERMINAL-A |
| 3 | APPLICATION | START OF FILE MANAGER | FILE MANAGER | |
| 4 | APPLICATION | DISPLAY OF SHARED FILE DIALOGUE | FILE MANAGER | |
| 5 | TIMER | 5 SECONDS PASSED | FILE MANAGER | |

FIG. 11B

| NUMBER | SOURCE OF EVENT | CONTENTS OF EVENT | OBJECT APPLICATION | NAME OF TERMINAL |
|---|---|---|---|---|
| 1 | APPLICATION | TERMINAL CONNECTED TO CONTROLLER | REMOTE CONTROLLER | TERMINAL-A |
| 2 | APPLICATION | START OF FILE MANAGER | FILE MANAGER | |

FIG. 11C

| NUMBER | SOURCE OF EVENT | CONTENTS OF EVENT | OBJECT APPLICATION | NAME OF TERMINAL |
|---|---|---|---|---|
| 1 | APPLICATION | TERMINAL CONNECTED TO CONTROLLER | REMOTE CONTROLLER | TERMINAL-A |
| 2 | APPLICATION | WORD PROCESSOR SOFTWARE | FILE MANAGER | |

FIG. 11D

| NUMBER | SOURCE OF EVENT | CONTENTS OF EVENT | OBJECT APPLICATION | NAME OF TERMINAL |
|---|---|---|---|---|
| 1 | APPLICATION | LOGIN BY USER-B | LOG-ON MANAGER | |
| 2 | APPLICATION | SPREAD SHEET SOFTWARE | FILE MANAGER | |

| NUMBER | SOURCE OF EVENT | CONTENTS OF EVENT | OBJECT APPLICATION | NAME OF TERMINAL | |
|---|---|---|---|---|---|
| 1 | APPLICATION | END OF FILE MANAGER | FILE MANAGER | | — 70A-1 |
| 2 | KEYBOARD | "Ctrl+ATL+DEL" | LOG-ON MANAGER | TERMINAL-A | — 70A-2 |
| 3 | APPLICATION | DISCONNECTION | REMOTE CONTROLLER | TERMINAL-A | — 70A-3 |

| NUMBER | SOURCE OF EVENT | CONTENTS OF EVENT | OBJECT APPLICATION | NAME OF TERMINAL |
|---|---|---|---|---|
| 1 | APPLICATION | END OF FILE MANAGER | FILE MANAGER | |

| NUMBER | SOURCE OF EVENT | CONTENTS OF EVENT | OBJECT APPLICATION | NAME OF TERMINAL |
|---|---|---|---|---|
| 1 | APPLICATION | LOG OFF | LOG-ON MANAGER | |

| NUMBER | SOURCE OF EVENT | CONTENTS OF EVENT | OBJECT APPLICATION | NAME OF TERMINAL |
|---|---|---|---|---|
| 1 | TIMER | 5 MINUTES PASSED | | |

FIG. 13

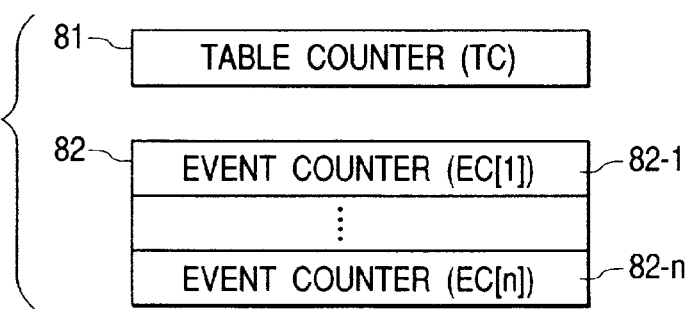

METHOD AND APPARATUS FOR REMOTELY CONTROLLING A TERMINAL BY A CONTROL TERMINAL AND STORING CONTROL HISTORY INFORMATION AT THE TERMINAL BEING REMOTELY CONTROLLED

BACKGROUND OF THE INVENTION (1) Field of the Invention

The present invention relates to a terminal for a computer network and a method of recording control operation history data, and more particularly to a technique of recording remote control operation history data in a computer network in which one of a plurality of terminals connected through the network is used as a control terminal for conducting remote control operation of another terminal on a screen sharing basis.

(2) Description of the Related Art

In Japanese Unexamined Patent Publication No. H8 (1996)-235093 and No. H3 (1991)-276342, for example, it has been proposed to provide a remote control type computer network system, comprising a plurality of terminals or computers, in which one of the terminals (control terminal) conducts remote operation of another terminal (remote controlled terminal) on a screen sharing basis.

In the remote control type computer network system, an input operation by an operator at the control terminal is transferred to the remote controlled terminal, and in response to the input operation, an application program is executed on the remote controlled terminal. When the contents displayed on a screen at the remote controlled terminal are changed as a result of execution of the application program, the contents thus changed are reflected to the control terminal. In this manner, the operator at the control terminal can carry out remote operation while viewing displayed contents identical to those at the remote controlled terminal.

As an operation history recording method in the remote control type computer network system mentioned above, there is a conventional technique in which remote control operation history information indicating the transition of displayed contents due to the operator's input operations is stored at the control terminal and a sequence of operations is reproduced at the control terminal as required, for example.

However, in this operation history recording method in which operation history data is stored at the control terminal, a user at the remote controlled terminal cannot check immediately whether the remote controlled terminal has been operated by another person and what operation has been performed during the absence of the user.

Further, according to the above-mentioned operation history recording method of storing operation history data at a control terminal, for example, when a system administrator carries out maintenance of a multiplicity of networked user terminals through remote operations in an intra-company information system, a huge amount of operation history data is stored in the terminal of the system administrator. This causes difficulty in storage and reference of the operation history data.

In a distributed processing type network in which data stored in a file server is accessed by a plurality of terminals, operation history data from each terminal is recorded into the file server on the remote controlled side. In this case, the operation history data is stored in the file server for such a purpose as troubleshooting. For example, as disclosed in Japanese Unexamined Patent Publication No. H6 (1994)-67956, operation history data indicating which terminal has performed what operation in which file region is recorded.

SUMMARY OF THE INVENTION

It is therefore an object of the present invention to provide a computer network terminal which works as a remote controlled terminal allowing a user to check remote control operation history data thereof with ease.

Another object of the present invention is to provide an operation history recording method which is applicable to a computer network, particularly to a remote control network system of a screen sharing type, for allowing a user at a remote controlled terminal to check remote operation history data thereof with ease.

A further object of the present invention is to provide an operation history recording method, applicable to a computer network, which can reduce the amount of remote operation history data at a control terminal by storing the history data in a distributed fashion.

In the present invention, for solving the above-mentioned problems, a remote controlled terminal is provided with a function for recording remote control operation history data so that a change in the displayed contents due to remote control can be reproduced easily.

More specifically, according to one aspect of the present invention, a terminal comprises means for receiving a remote operation message from a distant terminal through a network, input means for entering remote operation input information extracted from the received message into an operating system, and history recording means for recording the remote operation input information and transition of a terminal screen in response to the remote operation as remote operation history data.

Further, according to another aspect of the present invention, the terminal is provided with: communication control means for receiving remote operation input information from a distant terminal through a network, remote operation basic control means for entering the received remote operation input information into an operating system, and history recording means for creating a remote operation history file according to the remote operation input information and information supplied from the operating system to an application program and a display controller.

Still further, according to another aspect of the present invention, the history recording means automatically starts remote control operation history recording when remote operation input information from the distant terminal or terminal operations carried out in response to the remote operation input information satisfy a predetermined start condition.

Furthermore, according to another aspect of the present invention, the history recording means automatically stops remote operation history recording when remote operation input information from the distant terminal or terminal operations carried out in response to the remote operation input information satisfy a predetermined stop condition. The remote operation history recording may be automatically stopped after a lapse of a predetermined time period from the start of remote operation history recording.

According to the present invention, there is provided a remote operation history recording method for use in a computer network system in which one of a plurality of networked terminals is used as a control terminal for conducting remote operation of another terminal, comprising the steps of: (1) sending a remote operation message from the control terminal to a remote controlled terminal; (2) extracting remote operation input information from the remote operation message received by the remote controlled terminal, and executing a program operation at the remote controlled terminal according to the extracted remote operation input information; (3) storing, as operation history data, event information generated at the remote controlled terminal according to the remote operation input information; (4) sending a message indicating the results of execution of the program operation from the remote controlled terminal to the control terminal; and (5) storing, as operation history data, event information indicating the results of execution of the program operation at the remote controlled terminal.

BRIEF DESCRIPTION OF THE DRAWINGS

FIG. 2 is a diagram showing system configurations of a remote controlled terminal 100A and a control terminal 100B.

FIG. 9 is a diagram showing an example of a remote operation history file.

FIGS. 11A to 11D show exemplary recording start events tables 60.

FIGS. 12A to 12D show exemplary recording termination events tables 70.

FIG. 13 is a diagram showing a table counter 81 and an event counter 82 used by the operation recording and playing controller 25A.

DESCRIPTION OF THE PREFERRED EMBODIMENTS

The embodiments of the present invention will now be described in detail with reference to the accompanying drawings.

Figure 1:
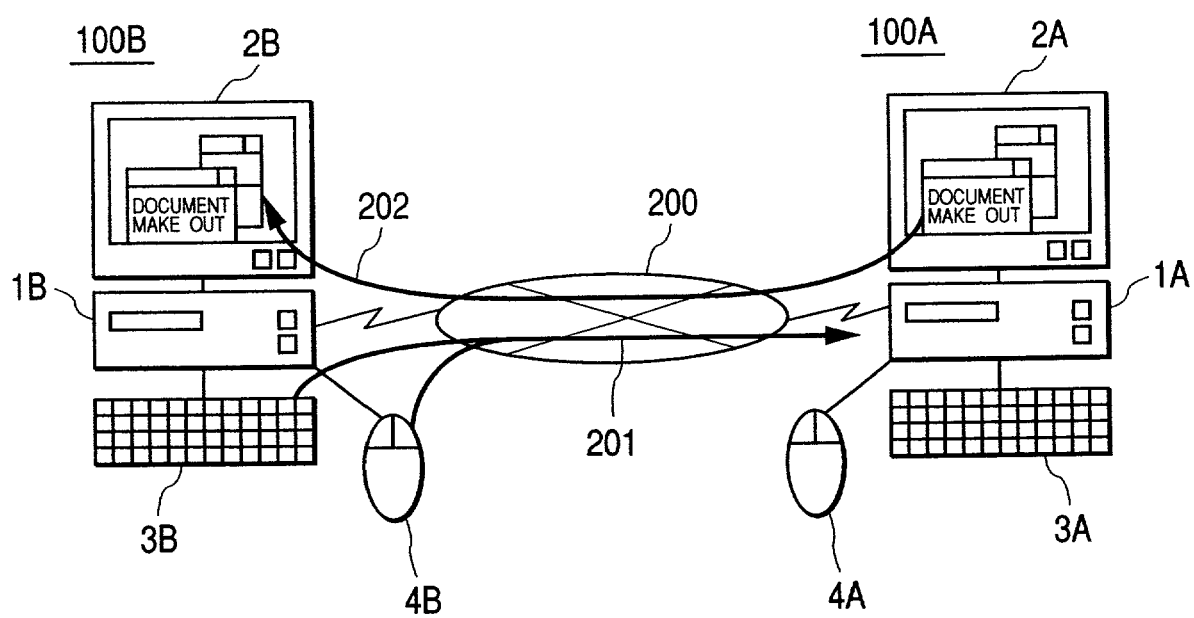
FIG. 1 is a diagram showing a basic configuration of a remote control type computer network system to which the present invention is applicable.

Referring to FIG. 1, there is shown a basic configuration of a remote control type computer network system to which the present invention is applicable.

This computer network system is comprised of a plurality of computers or terminals interconnected through a communication network 200. For the sake of simplicity, FIG. 1 shows just two terminals 100A and 100B working as a remote controlled terminal and a control terminal respectively. Each of these terminals comprises a display 2 (2A, 2B), a keyboard 3 (3A, 3B), a mouse 4 (4A, 4B), and a processor 1 (1A, 1B) equipped with a communication interface.

Each of the terminals 100A and 100B may be a general-purpose personal computer or a dedicated terminal having special functions such as a workstation. Further, as the communication network 200, a LAN (Local Area Network) may be employed in a company, or a public switched telephone network or an ISDN (Integrated Services Digital Network) may be employed in a case where terminals to be connected are located in a wide area.

In an intra-company information system, a multiplicity of terminals located at respective sections are interconnected through a communication network, and a system administrator belonging to an information system section carries out remote control for high-level operation tasks which are difficult for general terminal users, such as changing a table parameter or code in a specific application, acquiring and analyzing a faulty situation on occurrence of a trouble, and recovering from a trouble.

In the following description, the terminal 100A is treated as a remote controlled terminal (agent terminal) and the terminal 100B is treated as a control terminal (controller terminal). In a practical application, a single terminal may conduct remote control of a plurality of terminals, or contrarily a single terminal may be remote-controlled from a plurality of terminals. Further, in a modified arrangement, remote operation may be conducted in series in a plurality of remote controlled terminals by connecting one remote controlled terminal to another remote controlled terminal.

As shown in FIG. 1, the display 2B of the control terminal 100B presents the same contents as those on the display 2A of the remote controlled terminal 100A. When the operator at the control terminal 100B performs an input operation for a specific window on the display 2B using the keyboard 3B or the mouse 4B, input operation information is sent to the remote controlled terminal 100A through the communication network 200 as indicated by arrow 201. Then, at the remote controlled terminal 100A, the input operation information thus received is handled in the same manner as for input information from the keyboard 3A or the mouse 4A, and the results of execution of an application program on the remote controlled terminal 100A are reflected to the display 2B of the control terminal 100B as indicated by arrow 202.

Referring to FIG. 2, there are shown system configurations of the remote controlled terminal 100A and the control terminal 100B.

The processor 1A of the remote controlled terminal 100A is connected with the display 2A, keyboard 3A, mouse 4A, and such a storage device as a disk controller 5A with a disc storage. The processor 1A is provided with: a display driver 12A for connection with the display 2A, a keyboard driver 13A for connection with the keyboard 3A, a mouse driver 14A for connection with the mouse 4A, and software such as an operating system 10A (OS software), and plural kinds of application programs 11 to be executed under the operating system 10A.

Besides, the processor 1A is provided with the following software for implementing a remote operation function and a remote operation history recording function to be described later: a display driver hooking controller 22A for capturing screen drawing data output from the operating system 10A to the display driver 12A, a keyboard hooking controller 23A for capturing keyboard data input from the keyboard driver 13A to the operating system 10A, a mouse hooking controller 24A for capturing mouse data input from the mouse driver 14A to the operating system 10A, an application hooking controller 21A for monitoring the controlled state of each of the application programs 11 running under the operating system 10A, an operation recording and playing controller 25A for controlling the writing of operation history data to the disk controller 5A and the reading out of operation history data therefrom, a communication controller 26A for controlling information transfer through the communication network 200, and a remote operation basic controller 20A for presiding over these controllers.

On the other hand, the processor 1B of the control terminal 100B is connected with the display 2B, keyboard 3B, mouse 4B, and such a storage device as a disk controller 5B. In the same fashion as in the remote controlled terminal 100A, the processor 1B is provided with an operating system 10B, a display driver 12B, a keyboard driver 13B, and a mouse driver 14B. Besides, the processor 1B is provided with the following software for implementing a remote operation function and a remote operation history recording function: a keyboard hooking controller 23B, a mouse hooking controller 24B, an operation recording and playing controller 25B, a communication controller 26B, a display controller 27B for outputting screen drawing data received from the remote controlled terminal 100A on the display 2B, and a remote operation basic controller 20B for presiding over these controllers.

Figure 3:
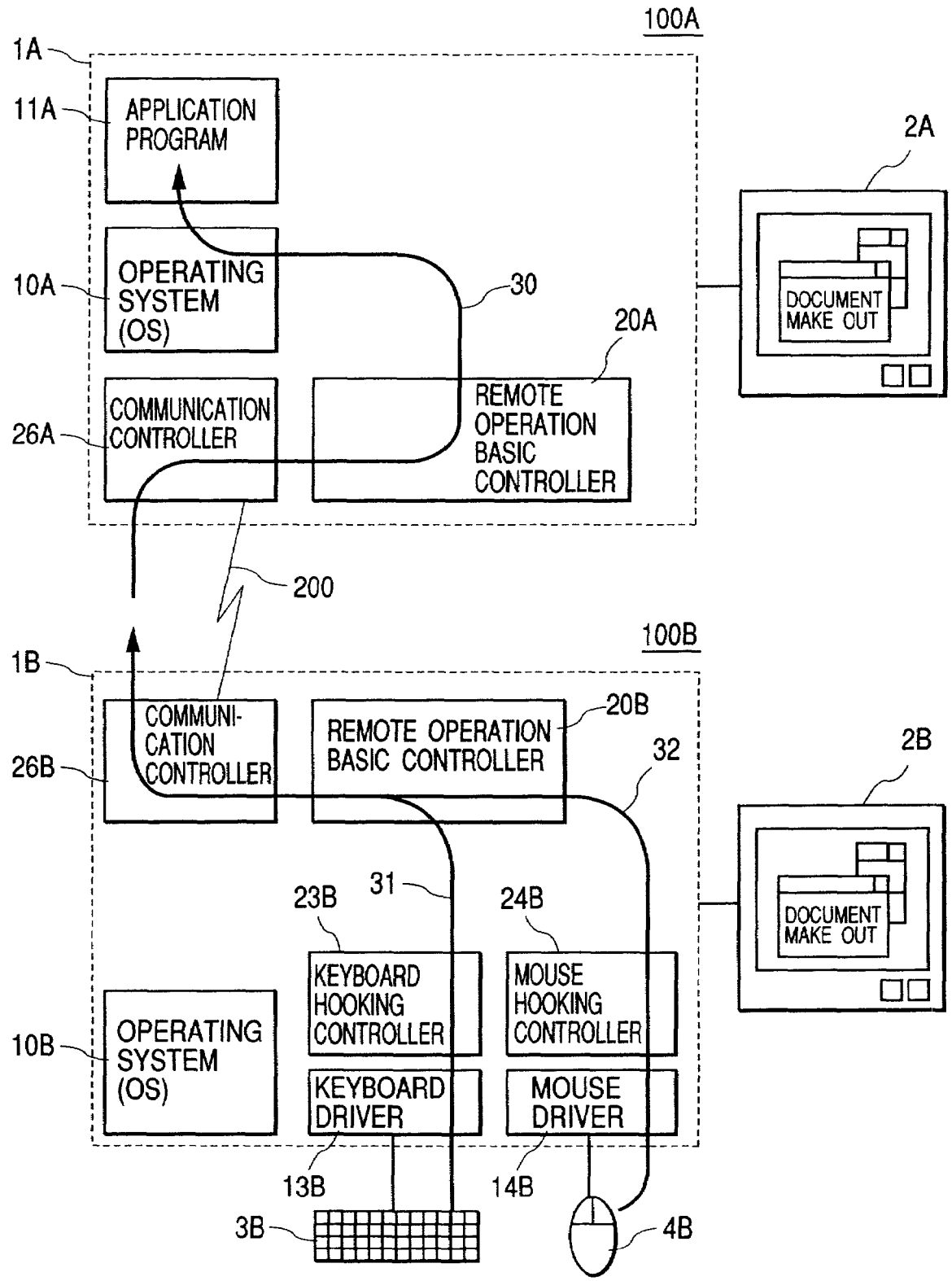
FIG. 3 is a diagram showing the transfer flow of remote operation input from the control terminal 100B to the remote controlled terminal 100A.

Referring to FIG. 3, there is shown a transfer flow of remote operation input data from the control terminal 100B to the remote controlled terminal 100A.

In a state that the display 2B of the control terminal 100B presents the same contents (window) as those on the remote controlled terminal 100A, when the operator at the control terminal 100B performs an input operation for a specific window on the display 2B using the keyboard 3B, the keyboard hooking controller 23B captures input data from the keyboard 3B and passes it to the remote operation basic controller 20B. When the operator performs an input operation using the mouse 4B, the mouse hooking controller 24B captures input data from the mouse 4B and passes it to the remote operation basic controller 20B. Each of these input data is converted into a message having a predetermined format by the remote operation basic controller 20B and sent out to the communication network 200 via the communication controller 26B. Thus, the message containing the input data is transferred to the remote controlled terminal 100A.

At the remote controlled terminal 100A, the above message is received by the communication controller 26A and passed to the remote operation basic controller 20A. Then, the remote operation basic controller 20A extracts the input data from the received message and passes the extracted input data to the operating system 10A. Analyzing the extracted input data, the operating system 10A carries out simulation on a corresponding one of the application programs 1A. In the application program 11A, the input data of remote operation is processed in the same manner as for data input from the keyboard 3A or the mouse 4A of the remote controlled terminal 10A.

Figure 4:
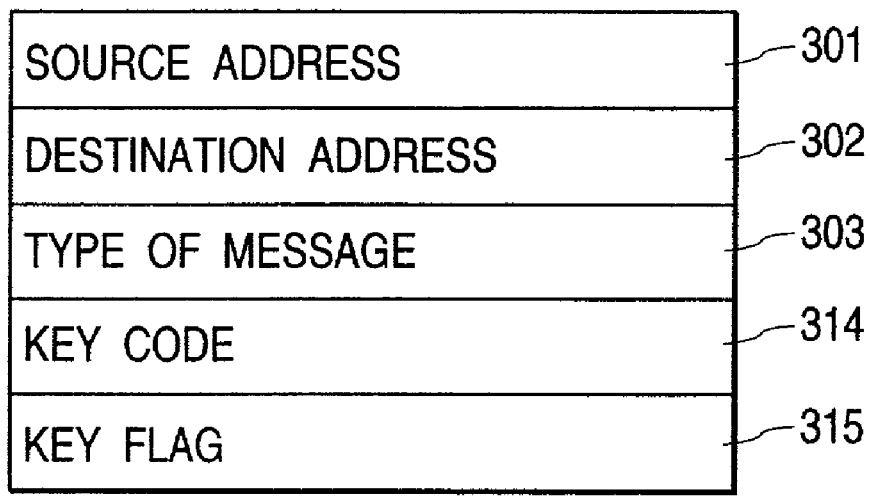
FIG. 4 is a diagram showing a message format for keyboard data to be sent from the control terminal 100B.

The data input from the keyboard 3B of the control terminal 100B is transmitted to the remote controlled terminal 100A in a message format, for example, as shown in FIG. 4.

In FIG. 4, reference numeral 301 indicates an address of source (control terminal), reference numeral 302 an address of destination (remote controlled terminal), reference numeral 303 a type code of message (data), reference numeral 314 a key code representing the kind of input key, and reference numeral 315 a key flag indicating whether a key has been pressed or released.

Figure 5:
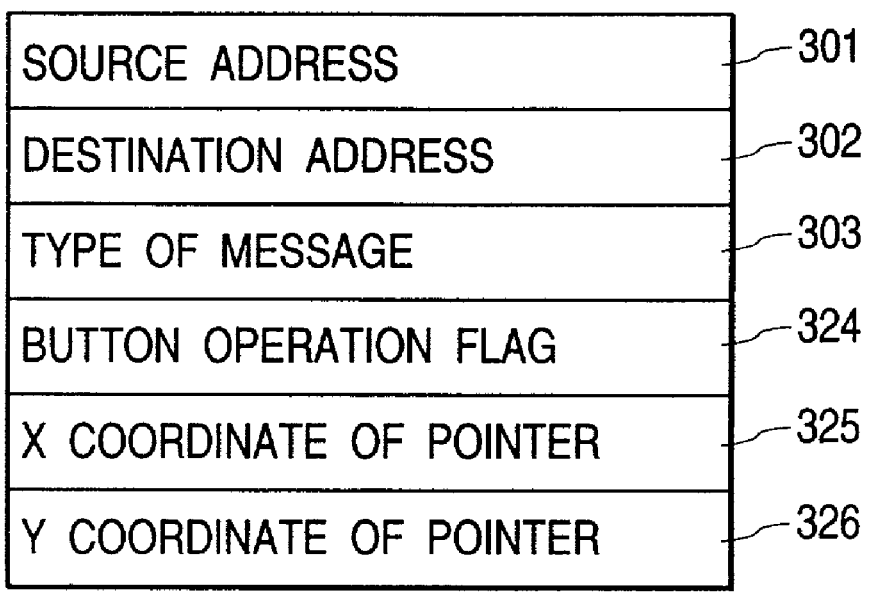
FIG. 5 is a diagram showing a message format for mouse data to be sent from the control terminal 100B.

The data input from the mouse 3B of the control terminal 100B is transmitted to the remote controlled terminal 100A in a message format, for example, as shown in FIG. 5.

The message for mouse input data comprises a source address 301, a destination address 302, a message type code 303, a button operation flag 324 indicating a mouse movement or a mouse button operation such as press or release of a mouse button, an X coordinate 325 and a Y coordinate 326 of a mouse-controlled pointer (cursor).

Figure 6:
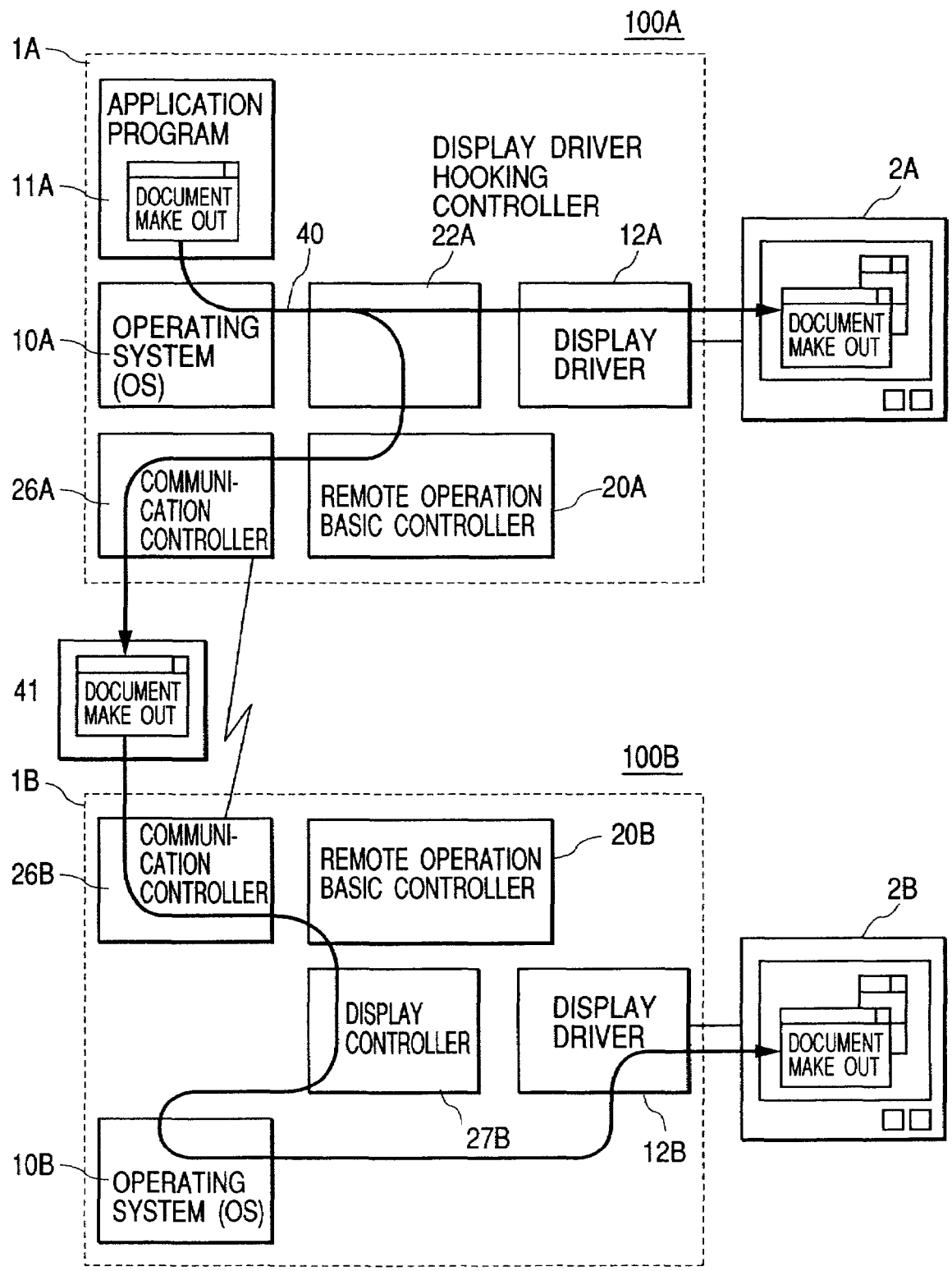
FIG. 6 is a diagram showing a flow of operation in execution of an application program on the remote controlled terminal 100A.

Referring to FIG. 6, there is shown an operation in execution of the application program 11A on the remote controlled terminal 100A.

When the application program 11A is executed in response to remote operation input data, the results of execution are reflected on the display 2A. In this case, screen drawing data 40 for altering the displayed contents is output from the application program 11A to the display driver 12A through the operating system 10A and the display driver hooking controller 22A. Thus, the current contents displayed on the display 2A are changed.

The display driver hooking controller 22A captures or copies the screen drawing data 40 transferred from the operating system 10A to the display driver 12A, and passes the screen drawing data 40 to the remote operation basic controller 20A. Then, the screen drawing data 40 is converted into a predetermined-format message 41 by the remote operation basic controller 20A, and the message 41 is transmitted to the communication network 200 via the communication controller 26A.

The above message 41 is received by the communication controller 26B of the control terminal 100B and passed to the remote operation basic controller 20B. Then, the remote operation basic controller 20B extracts the screen drawing data 40 from the received message 41 and passes the screen drawing data 40 thus extracted to the display controller 27B. The display controller 27B outputs the screen drawing data 40 to the display driver 12B through the operating system 10B. Thus, the same contents as those on the remote controlled terminal 100A are presented on the display 2B of the control terminal 100B.

In the display driver hooking controller 22A of the remote controlled terminal 100A, there may be provided such an arrangement that the entire screen drawing data corresponding to the full window is captured at the start of remote operation and after that, partial screen drawing data corresponding to just a change portion (difference data) in the displayed contents may be captured for reducing the amount of data to be transmitted, thereby to make a prompt response to the display 2B of the control terminal 100B even in the use of a communication line having a relatively low transmission rate.

Figure 7:
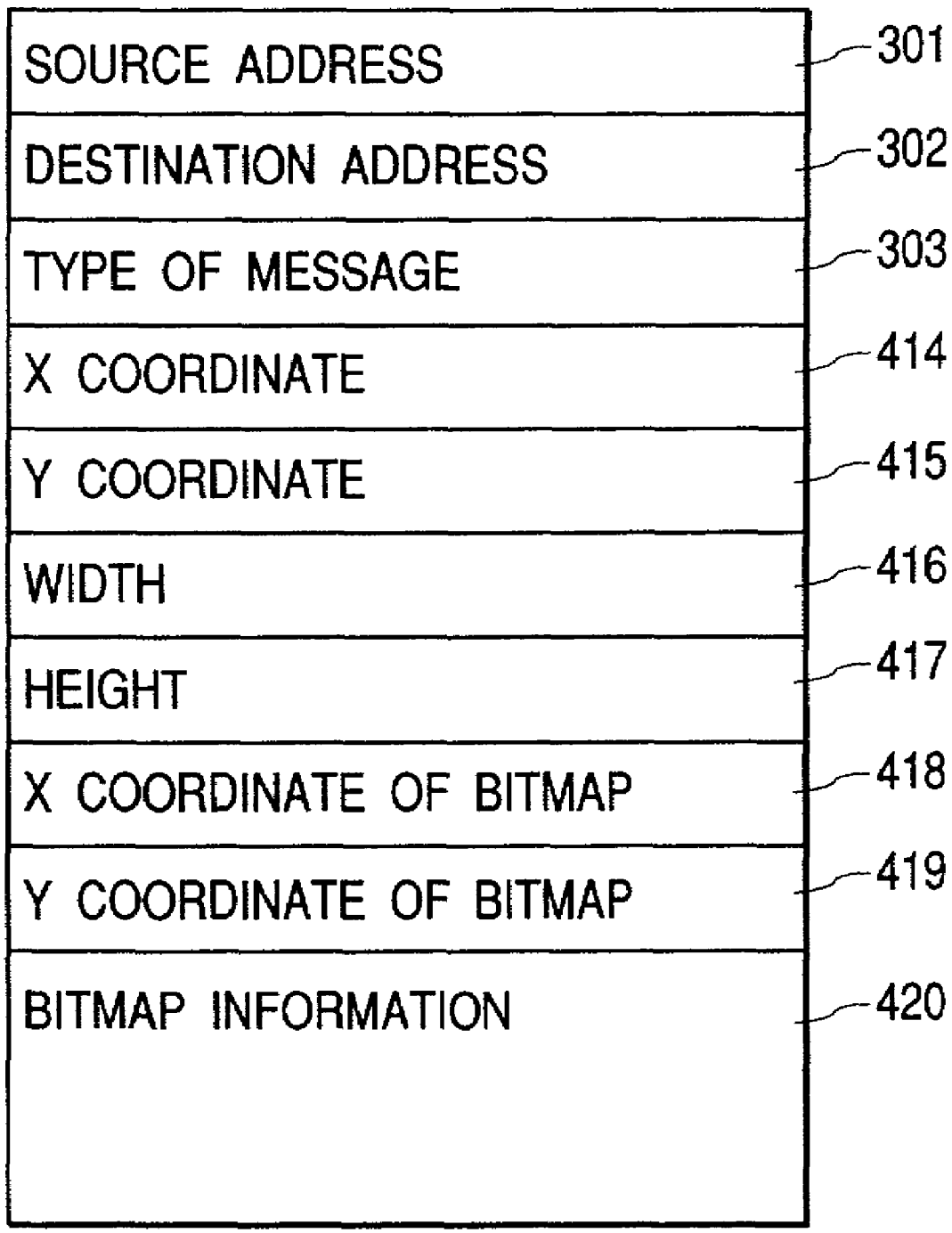
FIG. 7 is a diagram showing a message format for screen drawing data to be sent from the remote controlled terminal 100A to the control terminal 100B.

Referring to FIG. 7, there is shown an example of a message format for sending screen drawing data from the remote controlled terminal 100A to the control terminal 100B.

Figure 8:
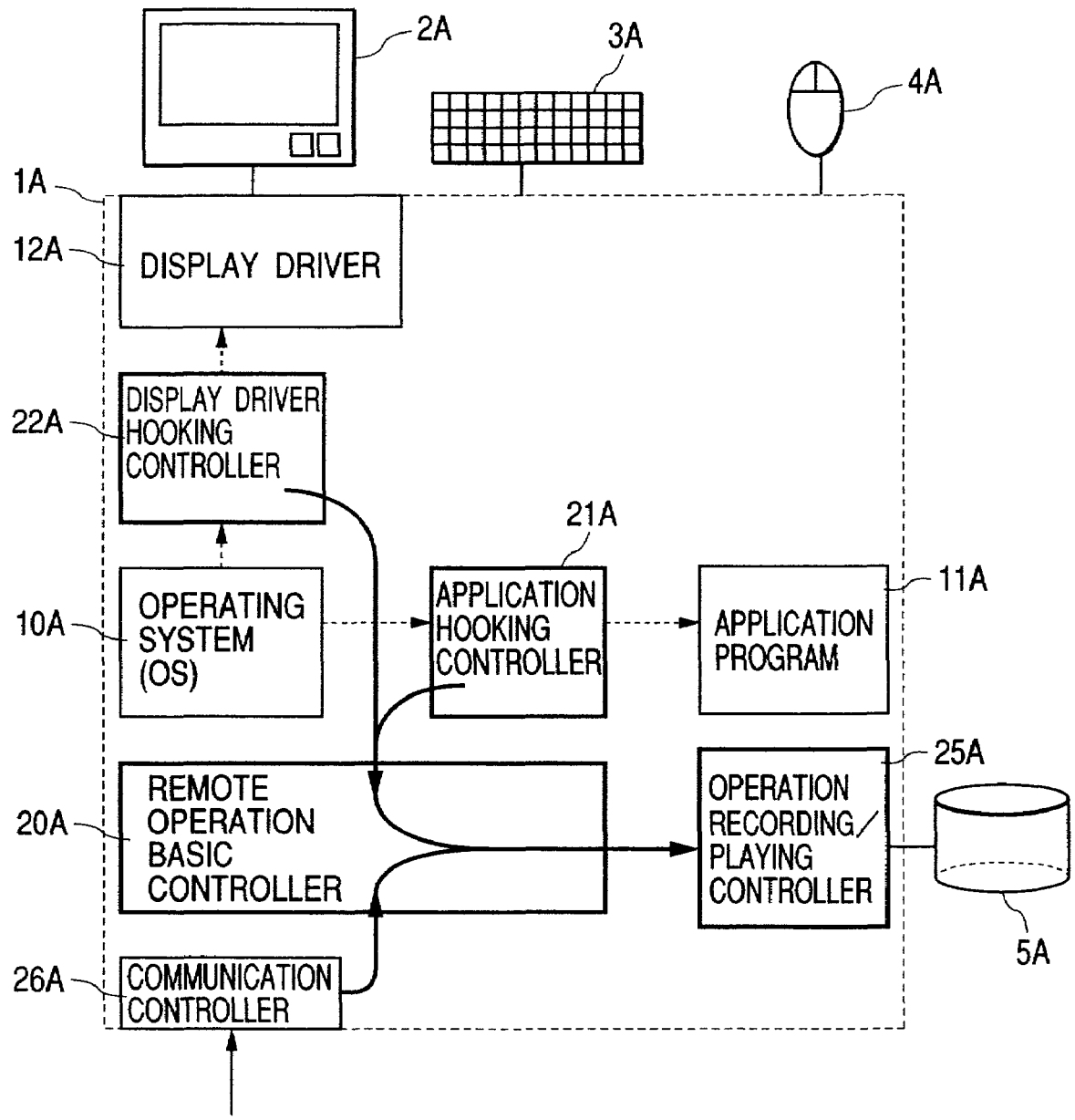
FIG. 8 is a diagram showing operation history recording at the remote controlled terminal 100A.

As shown in FIG. 7, the message format for screen drawing data comprises a source address 301, a destination address 302, a message type code 303, an X coordinate 414 and a Y coordinate 415 indicating the origin of a screen drawing area, a width value 416 and a height value 417 indicating the width and height of the screen drawing area, a bitmap X coordinate 418 and a bitmap Y coordinate 419 indicating the start point of bitmap drawing, and bitmap data 420, for example. then, with reference to FIG. 8, the following describes a method of operation history recording to be performed at the remote controlled terminal 10A.

A change in the control state (startup, termination, etc.) of the application program 11A under the operating system 10A is captured by the application hooking controller 21A, and a change in the displayed contents is captured by the display driver hooking controller 22A. Upon receipt of captured information from each of these hooking controllers, the remote operation basic controller 20A notifies the operation recording and playing controller 25A of an event source, event information and the current clock time to be stored as an operation history record. The remote operation basic controller 20A carries out the same processing on the remote operation input data, such as keyboard input data and mouse input data, received through the communication controller 26A, and notifies the remote operation recording and playing controller 25A of an event source, event information, and the current clock time.

Receiving the notification regarding the event source, event information and current clock time (time of event occurrence) from the remote operation basic controller 20A, the operation recording and playing controller 25A records them in a remote operation history file formed in the disk controller 5A. The location of a directory or a folder in which the remote operation history file is created can be specified for each remote operation, and operation history data may be encrypted as required.

Referring to FIG. 9, there is shown an example of a remote operation history (remote control history) file 50. The remote operation history file 50 comprises a plurality of entries 50-1 to 50-6 created in the order of a time of event occurrence, and each entry includes the fields of: a time of event (time of event occurrence) 51, a source of event 52, contents of event 53, details of event 54, an object application 55, and a terminal name 56.

In the source-of-event field 52, the name of a hooking controller in which an event has occurred is recorded, for example, in such a manner as "keyboard", "mouse", "display" or "application". The contents-of-event field 53 holds data indicating what event has occurred; e.g., "left click" for the mouse, "Ctrl key input" for the keyboard, "bitmap drawing" or "character drawing" for the display, and "start" or "stop" for the application.

In the details-of-event field 54, bitmap information drawn is recorded when the source of event is "display" and the contents of event is "bitmap drawing", and the name of an application program started is recorded when the source of event is "application" and the contents of event is "start", for example. The object application field 55 holds the name of an application program subjected to an event input or output, and the terminal name field 56 holds the name of a control terminal which has conducted remote operation. In a situation where an event has occurred in the remote controlled terminal of interest, the terminal name field 56 is left blank.

The operation history data exemplified in FIG. 9 provides the following meanings: At 10:30:25, a left-click mouse input occurred in a file manager on terminal-A (50-1). At 10:30:26, word processor software was started on the remote controlled terminal (50-2), and a window of the word processor was displayed (50-3). At 10:31:10, "test" was input to the word processor through a keyboard of terminal-A (50-4), and the "test" was displayed in the window of the word processor on the remote controlled terminal (50-5). Then, at 10:40:30, the remote controlled terminal is disconnected from terminal A (50-6).

Figure 10:
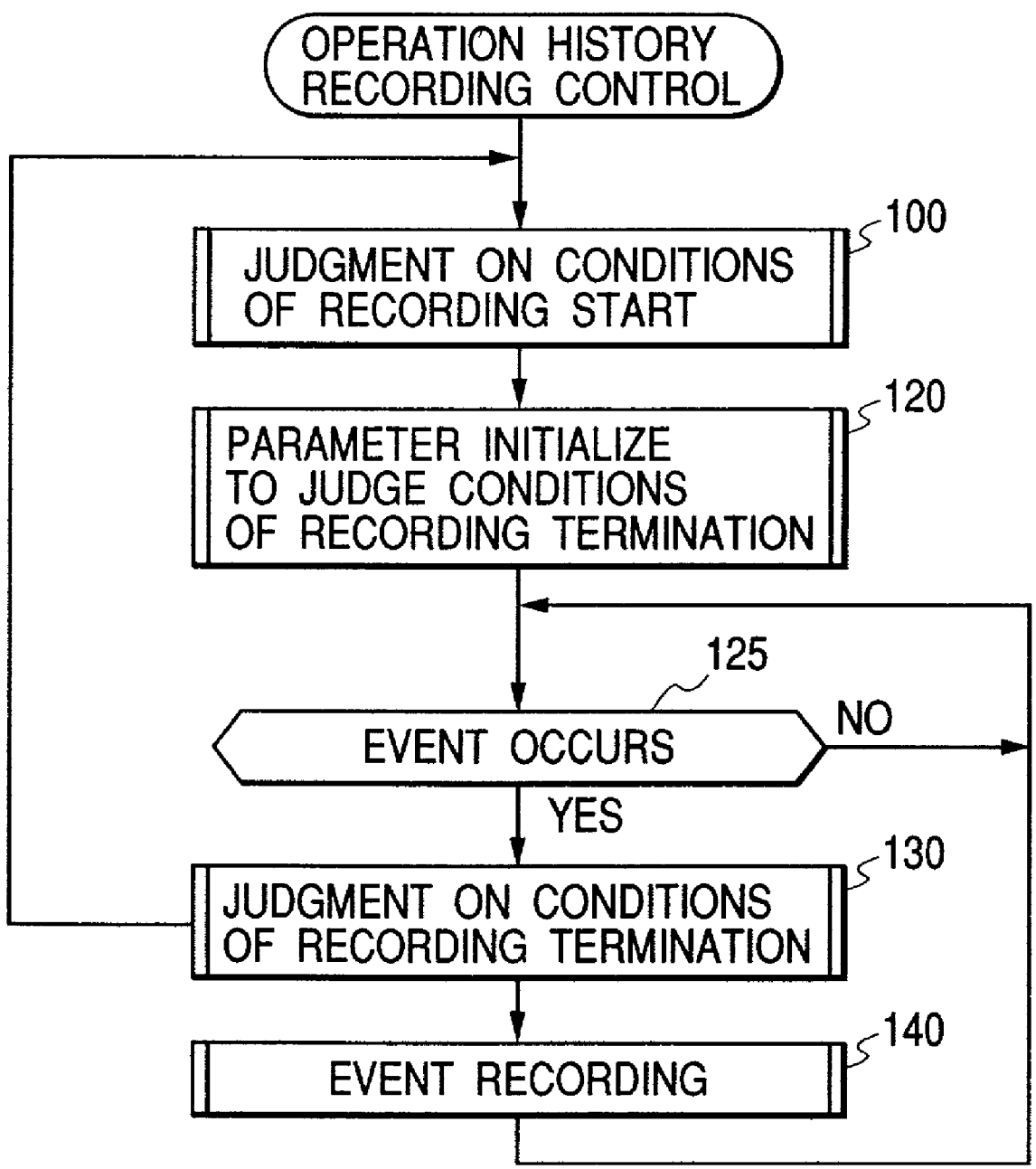
FIG. 10 is a flowchart showing the function of an operation recording and playing controller 25A.

Referring to FIG. 10, a flowchart is shown to indicate the function of the operation recording and playing controller 25A.

First, in the operation recording and playing controller (control routine) 25A, a process 100 for judgment on conditions of recording start is carried out. In this process 100, if an event group satisfying start-of-recording conditions is recognized, a parameter initialization process 120 is carried out to initialize parameters for judgment on termination of recording. Then, a wait is taken for an event input from the remote operation basic controller 20A (step 125).

When an event is input, a process 130 for judgment on conditions of recording termination is carried out. In this process 130, if it is judged that termination-of-recording conditions are satisfied, control is returned to the process 100 for judgment on conditions of recording start to make preparation for recording the next remote operation history data. If it is judged that the termination-of-recording conditions are not satisfied, a process 140 for event recording is carried out and after that, control is returned to step 125 for waiting for the next event input.

Referring to FIGS. 11A to 11D, there are shown exemplary recording start events tables 60A to 60D for the used of defining start-of-recording conditions to be referenced in the process 100 for judgment on conditions of recording start.

The recording of remote operation history data is started on occurrence of a particular event specified in the recording start events table. Where start-of-recording conditions are defined by a plurality of events in the recording start events table, it is judged that the start-of-recording conditions are satisfied if the plural events concerned occur in a predetermined sequence. Where a plurality of recording start events tables are prepared for indicating start-of-recording conditions, the recording of remote operation history data is started if start-of-recording conditions are satisfied in any of the recording start events tables.

In the recording start events table 60A shown in FIG. 11A, five events indicated by entries 60A-1 to 60A-5 are defined as start-of-recording conditions. Each entry includes the fields of: an event number 61 for specifying a sequence of occurrences of events, a source of event 62, contents of event 63, an object application 64, and a terminal name 65.

In the contents-of-event field 63, each event is defined in detail; e.g., "left click" for the mouse, "Ctrl key input" for the keyboard, and "start" or "control terminal connection" for the application, for example. The object application field 64 specifies the name of an application program subjected to an event input. The terminal name field 65 designates the name of a particular control terminal in a case where remote operation by the particular control terminal is to be monitored. Where a control terminal is not specified or the event concerned is not associated with remote operation, the terminal name field 65 is left blank.

The recording start events table 60A provides the following definitions: The control terminal-A sets up a connection to the remote controlled terminal (60A-1), "Ctrl+Alt+Del" is input from the keyboard of the control terminal-A (60A-2), a "file manager" application program is started (60A-3), a "shared file" property window or dialogue is displayed by the "file manager" (60A-4), and after a lapse of five seconds (60A-5) the recording of remote operation history data is started. Although a plurality of events are defined in the above table 60A, just a single event may be defined as a start-of-recording condition in a modified embodiment.

The recording start events tables 60B, 60C and 60D are presented in FIGS. 11B to 11D as other exemplary tables for defining start-of-recording conditions. In the table 60B, it is defined that after the control terminal-A sets up a connection to the remote controlled terminal, the "file manger" application program is started. In the table 60C, it is defined that after the control terminal-A sets up a connection to the remote controlled terminal, "word processor" software is started. In the table 60D, it is defined that after logging-on by user-B, "spreadsheet" software is started. Where a plurality of recording start events tables are provided as mentioned above, the recording of remote operation history data is started if start-of-recording conditions are satisfied in any of the recording start events tables.

Referring to FIGS. 12A to 12D, there are shown exemplary recording termination events tables 70A to 70D for the use of defining termination-of-recording conditions for remote operation history data to be referenced in the process 130 for judgment on conditions of recording termination.

In the recording termination events tables 70A to 70D, termination-of-recording conditions are defined by one or plural entries for specifying respective events. As in the recording start events tables 60A to 60D described above, each entry in the tables 70A to 70D includes the following fields: an event number 71, a source of event 72, contents of event 73, an object application 74, and a terminal name 75.

For example, in the recording termination events table 70A, it is defined as termination-of-recording conditions that a "file manager" application program is terminated (70-A), "Ctrl+Alt+Del" is input from the keyboard of the control terminal A (70A-2), and then the control terminal A is disconnected (70A-3). In the recording termination events tables 70B, 70C and 70D, termination of the "file manager", "logging-off", and a lapse of "five minutes from start of recording" are defined as termination-of-recording conditions, respectively.

Where a plurality of recording termination events tables are prepared as mentioned above, the recording of remote operation history data is terminated on occurrence of an event which meets the termination-of-recording conditions defined in any of the recording termination events tables.

In the process 100 for judgment on conditions of recording start, a table counter 81 and an event counter 82 shown in FIG. 13 are used. Where a plurality of recording start events tables 60 are prepared as shown in FIGS. 11A to 11D, the table counter 81 indicates a value of parameter TC for identifying a table to be checked. The event counter 82 comprises a plurality of counter regions 82-1 to 82-n corresponding to the recording start events tables 60, each indicating a value of parameter EC for specifying an entry to be checked in each recording start events table.

In the following description, a recording start events table specified by the parameter TC is referred to a table TC, an event counter value for the table TC is referred to as EC[TC], and an event defined in the "EC"th entry in the table TC is referred to as a table event EC[TC].

Figure 14:
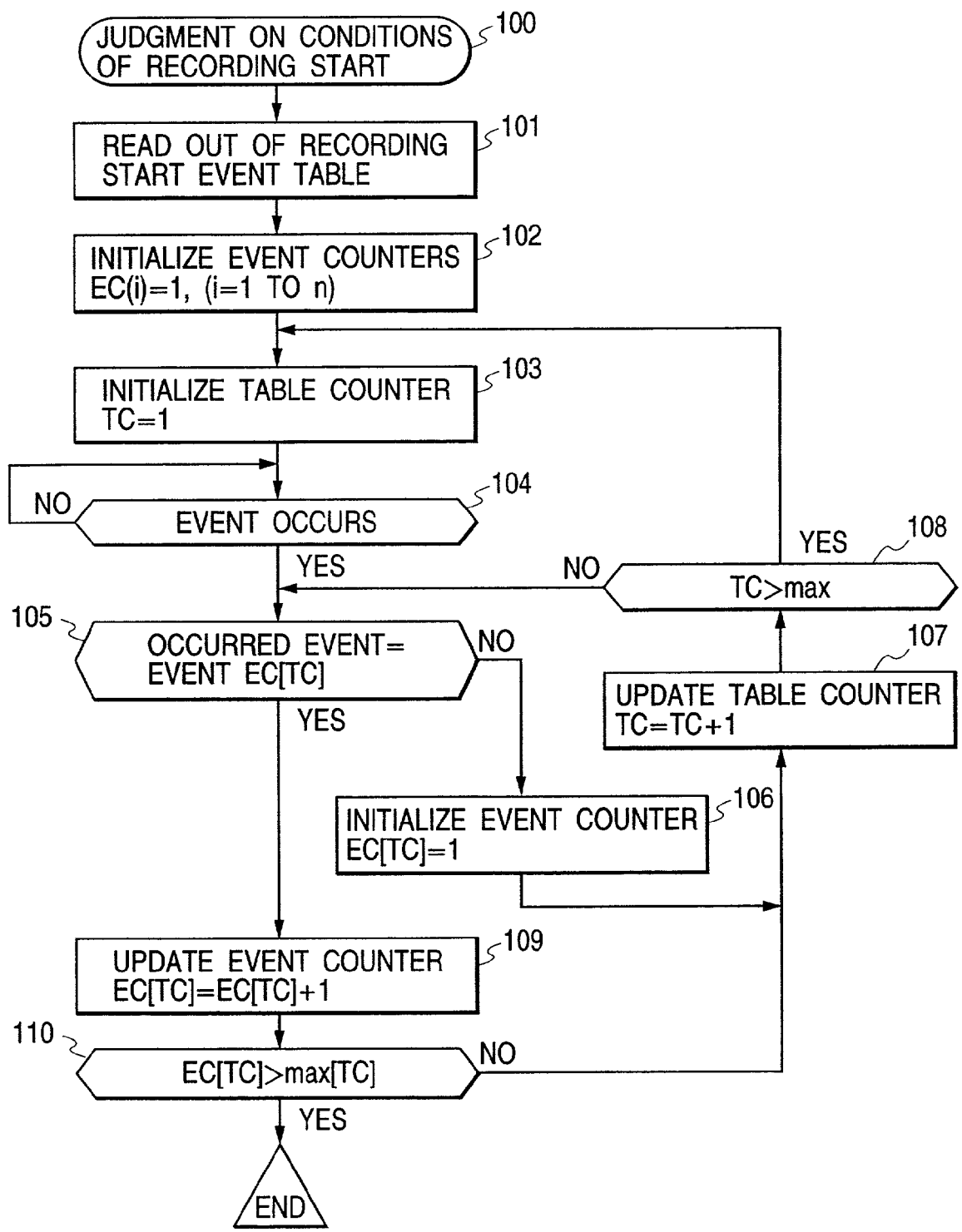
FIG. 14 is a flowchart showing details of a process 100 for judgment on conditions of recording start.

Referring to FIG. 14, there are shown details of the process 100 for judgment on conditions of recording start.

In the process 100 for judgment on conditions of recording start, all the recording start events tables are read in (step 101), and the value of a parameter EC indicated by each event counter 82 is initialized (102). Then, the value of a parameter TC indicated by the table counter 81 is initialized (103), and a wait is taken for an event input from the remote operation basic controller 20A (104). When an event is input, the event (hereinafter referred to as the generated event) is compared with the corresponding table event EC[TC] (105).

If the generated event does not match the table event EC[TC], the event counter value EC[TC] is initialized (106) and the table counter value TC is incremented (107). Then, it is judged whether or not the table counter value TC exceeds the maximum number of recording start events tables (108). If the table counter value TC exceeds the maximum number of recording start events tables, control is returned to step 103, whereby the table counter value TC is initialized and then a wait is taken for the next event. If the table counter value TC does not exceed the maximum number of recording start events tables, control is returned to step 105 in order to compare the generated event with the next table event EC[TC].

If the generated event matches the table event EC[TC], the event counter value EC[TC] is incremented (109) and then the incremented event counter value EC[TC] is compared with the maximum number "max[TC]" of entries in the table TC (110). If the incremented event counter value EC[TC] exceeds the max[TC], it signifies that start-of-recording conditions defined in the table TC are satisfied. The process 100 for judgment on conditions of recording start is therefore terminated. If the incremented event counter value EC[TC] does not exceed the max[TC], steps 107 and subsequent are repeated.

In the process 130 for judgment on conditions of recording termination, which will be described later, it is also required a parameter for identifying a recording termination events table 70 to be checked and a parameter for specifying an entry to be checked in each recording termination events table. Since the process 130 for judgment on conditions of recording termination is carried out after completion of the process 100 for judgment on conditions of recording start, the table counter 81 and the event counter 82 can be used to indicate values of these parameters.

Figure 15:
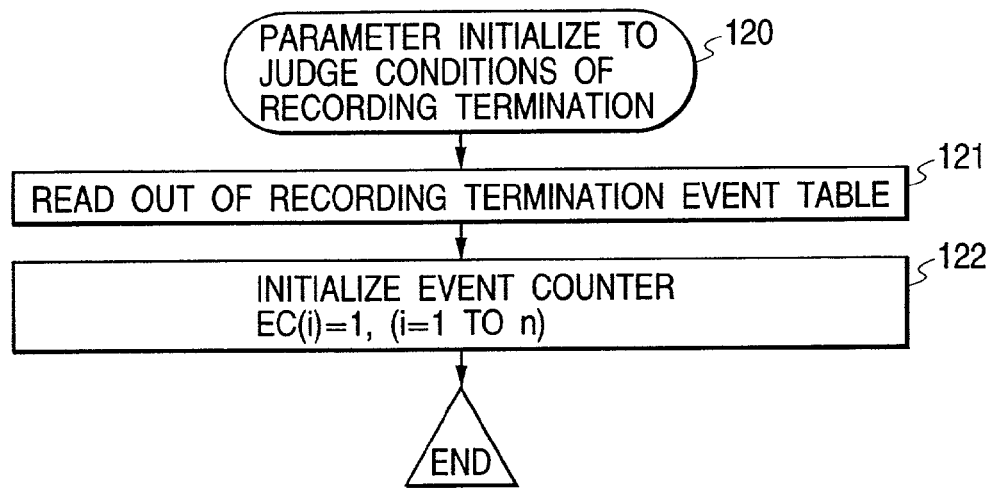
FIG. 15 is a flowchart showing details of a parameter initialization process 120 to initialize parameters for judgment on termination of recording.

Referring to FIG. 15, there are shown details of the parameter initialization process 120 to be performed to initialize parameters for judgment on termination of recording. In this initialization process 120, all the recording termination events tables 70 are read in (step 121), and then the value of a parameter EC indicated by each event counter 82 is initialized (122).

Figure 16:
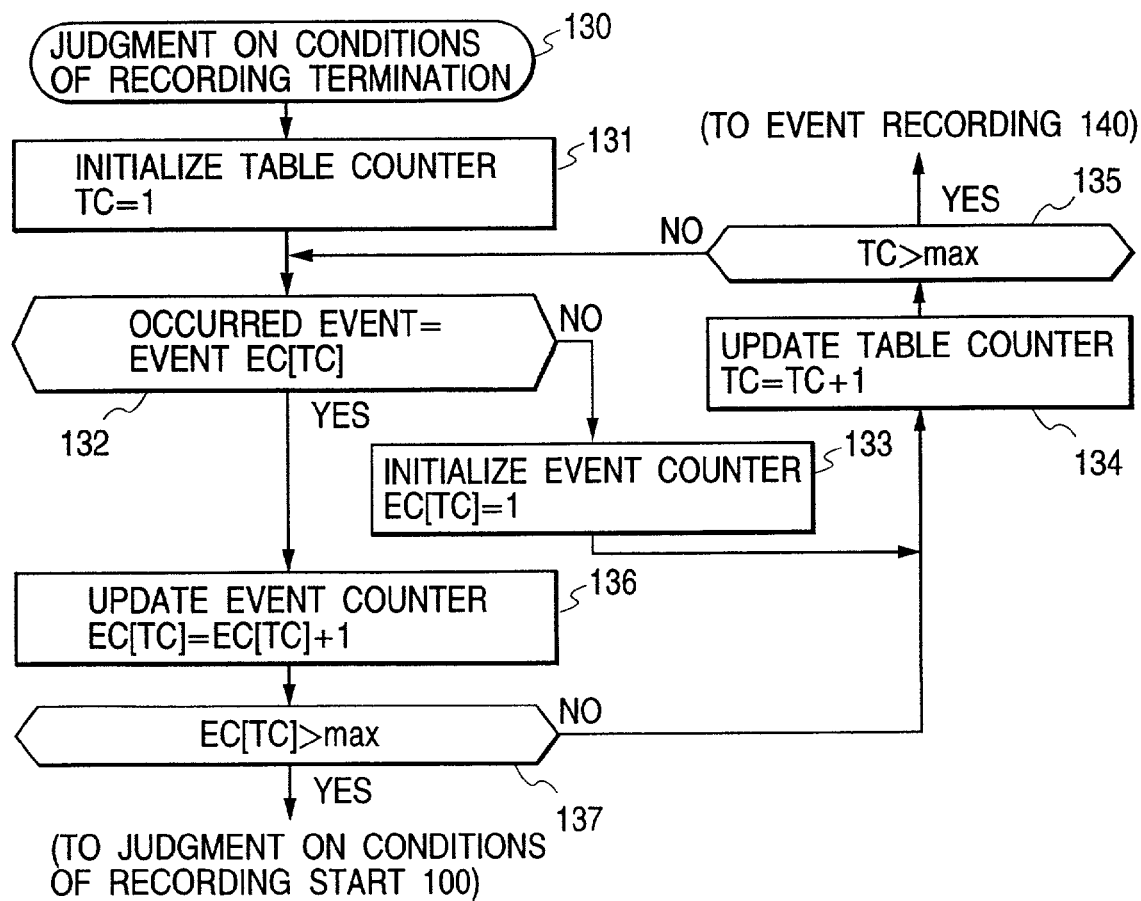
FIG. 16 is a flowchart showing details of a process 130 for the judgment on conditions of recording termination.

Referring to FIG. 16, there are shown details of the process 130 for judgment on conditions of recording termination. In the description of this process 130, a recording termination events table specified by the parameter TC is referred to as a table TC, an event counter value for the table TC is referred to as EC [TC] and an event defined in the "EC"th entry in the table TC is referred to as a table event EC[TC].

In the process 130 for judgment on conditions of recording termination, the value of a parameter TC indicated by the table counter 81 is initialized (step 131), and then a generated event is compared with the corresponding table event EC[TC] (132).

If the generated event does not match the table event EC[TC], the event counter value EC [TC] is initialized (133) and the table counter value TC is incremented (134). Then, it is judged whether or not the table counter value TC exceeds the maximum number of recording termination events tables (135).

If the table counter value TC exceeds the maximum number of recording termination events tables, it signifies that all the events tables have been checked. The process 130 for judgment on conditions of recording termination is therefore terminated, and then the event recording process 140 is carried out. If the table counter value TC does not exceed the maximum number of recording termination events tables, control is returned to step 132 in order to compare the generated event with the next table event EC[TC].

If the generated event matches the table event EC [TC], the event counter value EC [TC] is incremented (136) and then the incremented event counter value EC[TC] is compared with the maximum number "max[TC]" of entries in the table TC (137). If the incremented event counter value EC[TC] exceeds the max[TC], it signifies that termination-of-recording conditions defined in the table TC are satisfied. The process 130 for judgment on conditions of recording termination is therefore terminated, and control is returned to the process 100 for judgment on conditions of recording start shown in FIG. 10. If the incremented event counter value EC [TC] does not exceed the max [TC], steps 134 and subsequent are repeated.

Figure 17:
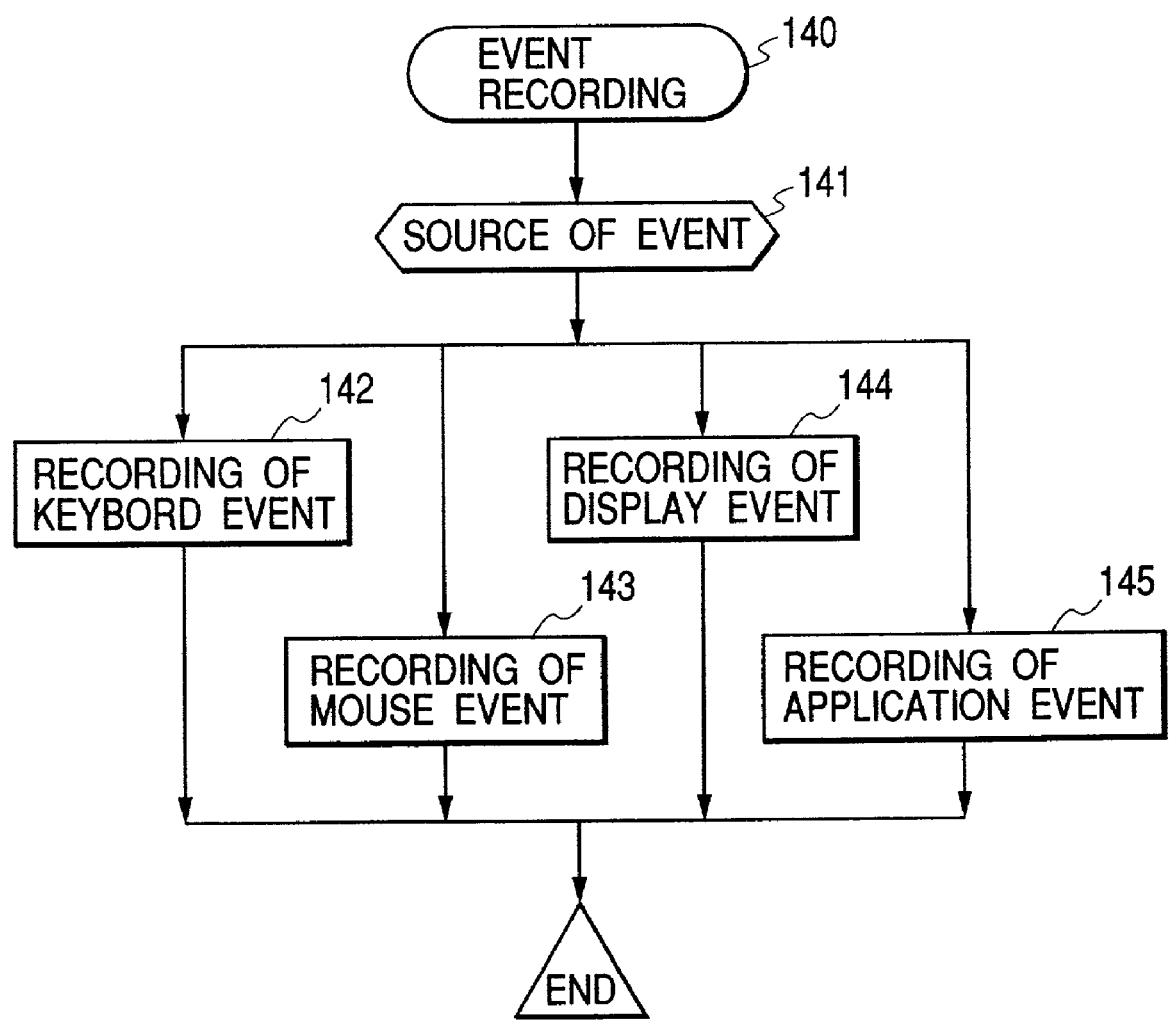
FIG. 17 is a flowchart showing details of an event recording process 140.

Referring to FIG. 17, there are shown details of the event recording process 140.

In the event recording process 140, a source of each event is checked (step 141). If a keyboard event is received, a keyboard event recording step is carried out (142). If a mouse event is received, a mouse event recording step is carried out (143). If a display event is received, a display event recording step is carried out (144). If an application event is received, an application event recording step is carried out (145).

By the keyboard event recording step (142) noted above, for example, the entry 50-4 shown in FIG. 9 is recorded. By the mouse event recording step (143), the entry 50-1 is recorded. By the display event recording step (144), the entries 50-3 and 50-5 are recorded. By the application event recording step (145), the entries 50-2 and 50-6 are recorded.

Next, the following describes a procedure of playing control for reading out operation history data from the remote operation history file 50 in the disk controller 5A.

Figure 18:
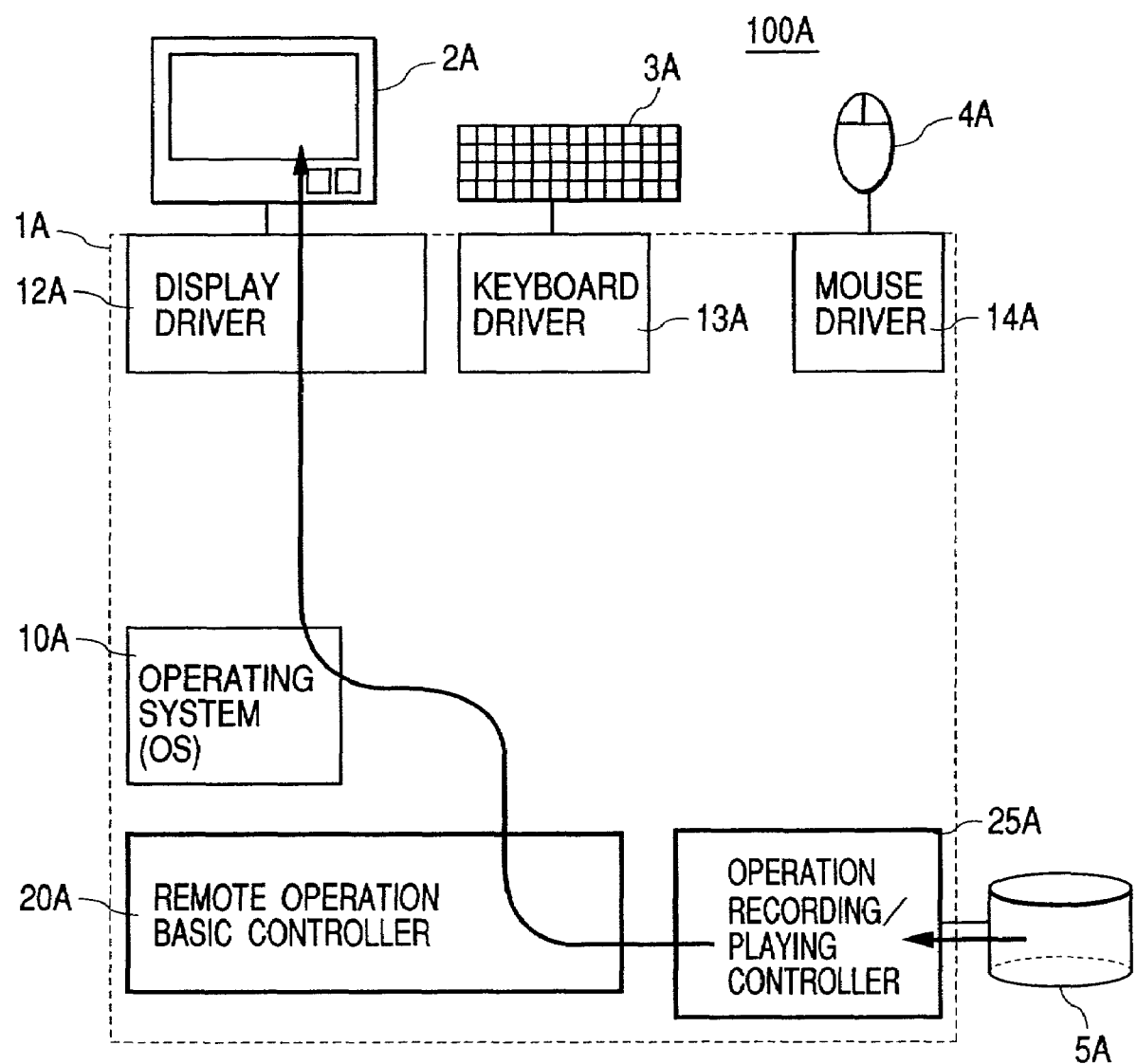
FIG. 18 is a diagram for explaining operation history playing control.

Referring to FIG. 18, there is shown a flow of operation history data in playing control at the remote controlled terminal 100A. The operation recording and playing controller 25A retrieves recorded operation history data from the remote operation history file 50 in the disk controller 5A and supplies the recorded operation history data to the remote operation basic controller 20A. Then, the remote operation basic controller 20A outputs the recorded operation history data to the display 2A through the operating system 10A and the display driver 12A.

Figure 19:
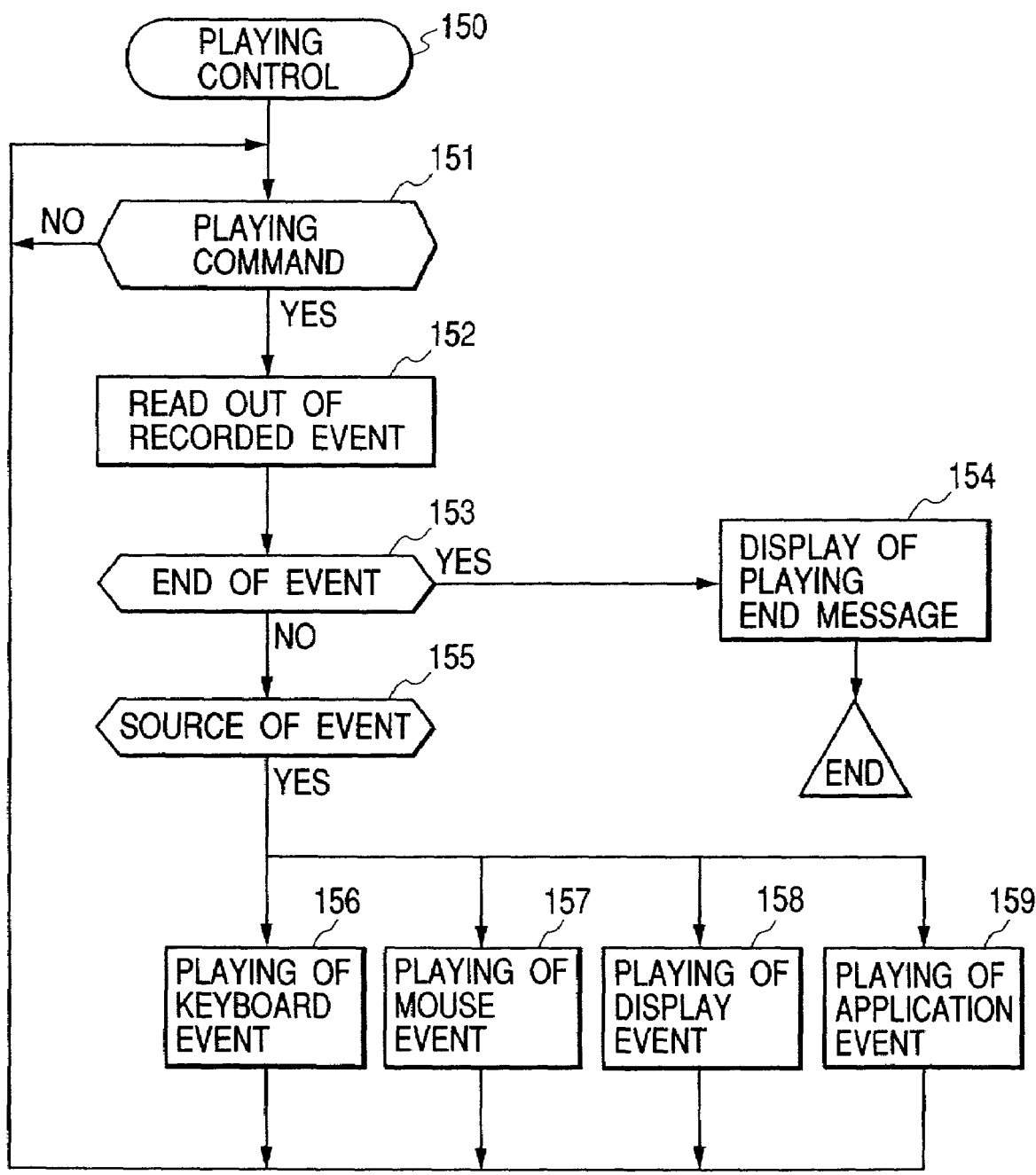
FIG. 19 is a flowchart of operation history playing control 150.

Referring to FIG. 19, there is shown a flowchart of a playing control routine 150 in the operation recording and playing controller 25A.

In execution of the playing control routine 150, a playing command from the user is waited (step 151). Upon reception of a read command issued by an enter key action for example, a count parameter "i" (initial value=0) is incremented and the "i"th recorded event (entry 50-i) is read out from the remote operation history file 50 (step 152). When there remains no recorded event to be read out, a message indicating the end of playing control is presented (154) and the playing control routine 150 is terminated.

For the recorded event read out from the remote operation history file 50, the event source is checked to assign the event to a processing step corresponding to the event source (155). If a keyboard event is read out, a keyboard event playing step is carried out (156). If a mouse event is read out, a mouse event playing step is carried out (157). If a display event is read out, a display event playing step is carried out (158). If an application event is read out, an application event step is carried out (159). Upon completion of the playing step for one event, control is returned to step 151 to wait for the next read command.

In the remote operation history data shown in FIG. 9, events of interest to the user who is watching the display screen are, for example, the display events 50-3 and 50-5. These events are processed through the display event playing step (158). When the display event 50-3 is read out, a window of the word processor software is displayed. Then, when the display event 50-5 is read out, a character string "test" is presented on the window of the word processor.

The display event 50-3 has been generated through execution of the mouse event 50-1 and execution of the application event 50-2 associated with the execution of the mouse event. The display event 50-5 has been generated through execution of the keyboard event 50-4. In playing control, it is not required to execute each event actually in the keyboard event playing step (156) for processing the keyboard event 50-4, in the mouse event playing step (157) for processing the mouse event 50-1, and in the application playing step (159) for processing the application event 50-2.

Therefore, for example, it is preferable to provide such an arrangement that data items 51 to 56 contained in each event (entry 50-i) read out from the remote operation history file 50 are converted into character strings in a predetermined format and these character strings are displayed to let the user know the details of remote operation and the state transitions of each application program. Further, in a modified arrangement, particular input operations, e.g., only the mouse-related events, selected among from the operation history data may be played back in accordance with the designation by the user.

Figure 20:
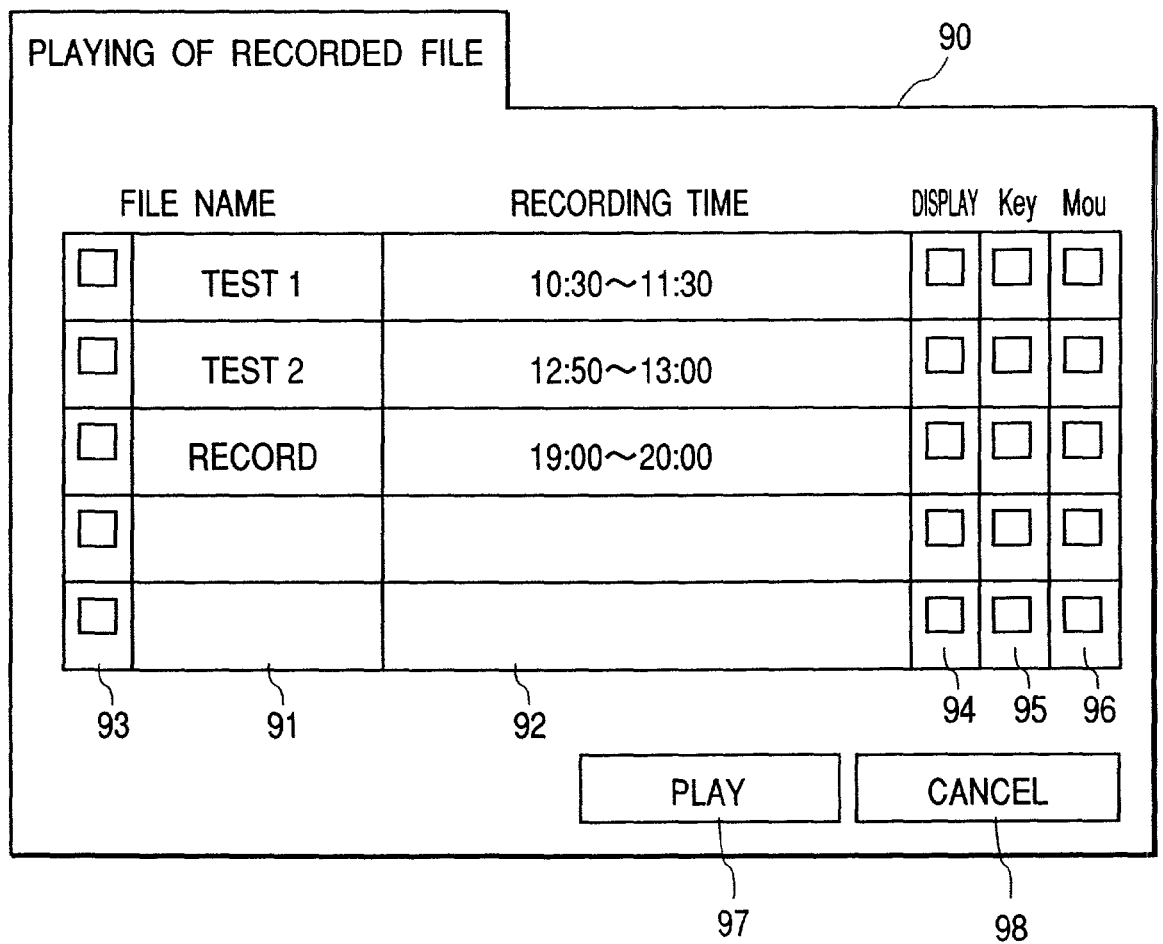
FIG. 20 is a diagram showing an example of a graphical user interface window for operation history playing control.

Referring to FIG. 20, there is shown an example of a graphical user interface (GUI) window 90 to be used for playing control of remote operation history data.

In the GUI window 90 exemplified in FIG. 20, a file name 91 and a recording time 92 of each remote operation history file 50 are displayed. It is allowed for the user to specify a desired file to be played using a selection button 93 and a desired event type using one of a plurality of selection buttons 94 to 96. After specifying the desired file and event type using these selection buttons, the user clicks a play button 97. Thus, the playing control routine described above is started. Upon completion of execution of the playing control routine 150, if it is desired to play operation history data of another history file, the user repeats the procedure similar to that stated above. Alternatively, if it is desired to quit the playing of operation history data, the user may click a cancel button 98.

While the remote operation history recording function of the remote controlled terminal 100A has be described so far, the control terminal 100B can record the operation history data using the operation recording and playing controller 25B in a manner similar to that in conventional arrangements. If operation history data meeting each user need is accumulated at both the control terminal and the remote controlled terminal, it is possible to reduce the amount of operation history data to be stored in the disk controller of each terminal. For example, the disk controller 5B of the control terminal may store the history data as to input operations on the screen for an application program under the remote control while the disk controller 5A of the remote controlled terminal stores operation history data as to the entire desktop screen.

Although the recording of remote operation history data is automatically started when predetermined start-of-recording conditions are satisfied and the recording is automatically stopped when predetermined termination-of-recording conditions are satisfied in the preferred embodiments described above, a recording pause period may be provided as required for reducing the amount of operation history data to be stored, i.e., history data recording may be carried out intermittently. In this case, to compensate for discontinuity in screen transitions, it is preferable to capture the entire screen data each time history data recording is restarted on an intermittent basis.

According to the present invention, as set forth hereinabove, since remote operation history data can be stored at each remote controlled terminal, the user of the remote controlled terminal can easily check details of remote operation conducted by another person at the control terminal. Further, since remote operation history data is distributively stored at a plurality of remote controlled terminals, it is possible to reduce the amount of remote operation history data to be stored at the control terminal.

What is claimed is:

1. A computer to be remotely controlled from a distant control computer through a network, the distant control computer remotely controlling the computer through the network, the computer comprising:

means for receiving a remote operation message from the distant control computer through the network;

means for extracting remote operation input information relating to software being executed by the computer from the received remote operation message, and entering the remote operation input information into an operating system of the computer to cause the software being executed by the computer to perform a particular function; and history recording means for recording the remote operation input information at the computer being remotely controlled by the distant control computer in response to the remote operation input information as remote control history data.

2. The computer according to claim 1, wherein the history recording means includes means for automatically starting remote operation history recording when it is judged that remote operation input information from the distant control computer or a computer operation in response to the remote operation input information satisfies a predetermined start condition.

3. The computer according to claim 1, wherein the history recording means includes means for automatically stopping remote operation history recording when it is judged that remote operation input information from the distant control computer or a computer operation in response to the remote operation input information satisfies a predetermined stop condition.

4. The computer according to claim 1, wherein remote operation history recording is stopped after a lapse of a predetermined time period from the start of remote operation history recording.

5. A computer to be remotely controlled from a distant control computer through a network, the distant control computer remotely controlling the computer through the network, the computer comprising:

communication control means for receiving remote operation input information relating to software being executed by the computer from the distant control computer through the network;

remote operation basic control means for entering the received remote operation input information into an operating system of said computer to cause the software being executed by the computer to perform a particular function; and history recording means for creating a remote control history file at the computer being remotely controlled by the distant control computer according to the remote operation input information and information supplied from the operating system of said computer to the software.

6. The computer according to claim 5, wherein said remote operation basic control means generates a message for reflecting the change in a computer screen in response to the remote operation input information to said distant computer, and sends the generated message to the network via said communication control means.

7. The computer according to claim 5, wherein the history recording means includes means for automatically starting remote operation history recording when it is judged that remote operation input information from the distant control computer or a computer operation in response to the remote operation input information satisfies a predetermined start condition.

8. The computer according to claim 5, wherein the history recording means includes means for automatically stopping remote operation history recording when it is judged that remote operation input information from the distant control computer or a computer operation in response to the remote operation input information satisfies a predetermined stop condition.

9. A computer to be remotely controlled from a distant control computer through a network, the distant control computer remotely controlling the computer through the network, the computer comprising:

communication control means for receiving a remote operation message relating to software being executed by the computer from the distant computer through the network;

remote operation basic control means for entering remote operation input information from the received remote operation message, and entering the remote operation input information into an operating system of the computer to cause the software being executed by the computer to perform a particular function;

hooking means for capturing information supplied from the operating system of said computer to the software; and history recording means for creating event data at the computer being remotely controlled by the distant control computer according to the remote operation input information and the information captured by the hooking means and for recording the created event data in a remote control history file.

10. The computer according to claim 9, wherein said remote operation basic control means generates a message for reflecting the change in a computer screen in response to the remote operation input information to said distant computer, and sends the generated message to the network via said communication control means.

11. The computer according to claim 9, wherein the history recording means includes means for automatically starting remote operation history recording when it is judged that remote operation input information from the distant control computer or a computer operation in response to the remote operation input information satisfies a predetermined start condition.

12. The computer according to claim 9, wherein the history recording means includes means for automatically stopping remote operation history recording when it is judged that remote operation input information from the distant control computer or a computer operation in response to the remote operation input information satisfies a predetermined stop condition.

13. A remote operation history recording method for use in a computer network system in which one of a plurality of computers is used as a control computer for conducting remote operation of another computer to be a remote controlled computer, the method comprising the steps of:

sending a remote operation message relating to software being executed by the computer from said control computer to said remote controlled computer;

extracting remote operation input information from the remote operation message received by the remote controlled computer, and causing the software to perform a function at the remote controlled computer according to the extracted remote operation input information upon input of the remote operation message into an operating system of said remote controlled computer;

storing, as operation history data, event information generated according to the remote operation input information at the remote controlled computer;

sending a message indicating the results of execution of the program operation from the remote controlled computer to the control computer; and storing, as operation history data, event information indicating the results of the program operation at the remote controlled computer.

14. The remote operation history recording method according to claim 13, wherein the remote controlled computer judges whether or not the remote operation input information extracted from the remote operation message relating to software being executed by the computer received from the control computer or a program operation executed in response to the remote operation input information satisfies a predetermined start condition, and if the predetermined start condition is satisfied, remote operation history recording is started at the remote controlled computer to store event information based on the remote operation input information and event information indicating the results of execution of the program operation.

15. A computer to be remotely controlled from a distant control computer through a network, the distant control computer remotely controlling the computer through the network, the computer comprising:

means for receiving a remote operation message relating to software being executed by the computer from the distant control computer through the network;

means for extracting remote operation input information extracted from the received remote operation message into an operating system of said computer to cause the software being executed by the computer to perform a particular function;

history recording means for recording in a memory the remote operation input information as remote control history data at the computer being remotely controlled by the distant control computer; and means for displaying remote control history information on a display screen of the computer based on the remote control history data recorded in the memory according to a request from a computer user.

16. The computer according to claim 15, wherein history recording means records in said memory, as a part of the remote control history data, transition of display which has occurred on said computer display screen in response to processing the remote operation input information.

17. The computer according to claim 15, wherein the history recording means includes means for automatically starting remote operation history recording when it is judged that remote operation input information from the distant control computer or a computer operation in response to the remote operation input information satisfies a predetermined start condition.

18. The computer according to claim 15, wherein the history recording means includes means for automatically stopping remote operation history recording when it is judged that remote operation input information from the distant control computer or a computer operation in response to the remote operation input information satisfies a predetermined stop condition.

19. The computer according to claim 15, wherein remote operation history recording is stopped after a lapse of a predetermined time period from the start of remote operation history recording.

20. A computer to be remotely controlled from a distant control computer through a network, the distant control computer remotely controlling the computer through the network, the computer comprising:

communication control means for receiving remote operation input information relating to software being executed by the computer from the distant control computer through the network;

remote operation basic control means for entering the received remote operation input information into an operating system of said computer to cause the software being executed by the computer to perform a particular function;

history recording means for creating a remote control history file at the computer being remotely controlled by the distant control computer including the remote operation input information and information supplied from the operating system to an application program and a display controller; and means for displaying remote control history information on a display screen of the computer based on the contents of said remote control history file according to a request from a computer user.

21. The computer according to claim 20, wherein the history recording means includes means for automatically starting remote operation history recording when it is judged that remote operation input information from the distant control computer or a computer operation in response to the remote operation input information satisfies a predetermined start condition.

22. The computer according to claim 20, wherein the history recording means includes means for automatically stopping remote operation history recording when it is judged that remote operation input information from the distant control computer or a computer operation in response to the remote operation input information satisfies a predetermined stop condition.

23. A computer to be remotely controlled from a distant control computer through a network, the distant control computer remotely controlling the computer through the network, comprising:

communication control means of receiving a remote operation message relating to software being executed by the computer from the distant control computer through the network;

remote operation basic control means for entering remote operation input information extracted from the received remote operation message into an operating system of said computer to cause the software being executed by the computer to perform a particular function;

hooking means for capturing information supplied from the operating system of said computer to an application program and a display controller;

history recording means for creating event data including the remote operation input information and the information captured by the hooking means and for recording the created event data in a remote control history file at the computer being remotely controlled by the distant control computer; and means for displaying remote control history information on a display screen of the computer based on the contents of said remote control history file according to a request from a computer user.

24. The computer according to claim 20, wherein said remote operation basic control means generates a message for reflecting the change in a computer screen in response to the remote operation input information to said distant computer, and sends the generated message to the network via said communication control means.

25. The computer according to claim 23, wherein said remote operation basic control means generates a message for reflecting the change in a computer screen in response to the remote operation input information to said distant computer, and sends the generated message to the network via said communication control means.

26. The computer according to claim 23, wherein the history recording means includes means for automatically starting remote operation history recording when it is judged that remote operation input information from the distant control computer or a computer operation in response to the remote operation input information satisfies a predetermined start condition.

27. The computer according to claim 23, wherein the history recording means includes means for automatically stopping remote operation history recording when it is judged that remote operation input information from the distant control computer or a computer operation in response to the remote operation input information satisfies a predetermined stop condition.

28. A computer to be remotely controlled by a distant control computer through a network, said computer comprising:
means for receiving a remote operation message from the distant control computer through the network;
means for extracting remote operation information relating to software being executed by the computer from the received remote operation message which is input into an operating system of said computer to cause the software being executed by the computer to perform a particular function; and
history recording means for recording, as remote control history data, the remote operation information, which has been extracted from the received remote operation message by said means for extracting, at said computer being remotely controlled by the distant control computer in response to input of the remote operation message into the operating system of said computer.

29. The computer according to claim 28, wherein the history recording means includes means for automatically starting remote operation history recording when it is judged that remote operation input information from the distant control computer or a computer operation in response to the remote operation input information satisfies a predetermined start condition.

30. The computer according to claim 28, wherein the history recording means includes means for automatically stopping remote operation history recording when it is judged that remote operation input information from the distant control computer or a computer operation in response to the remote operation input information satisfies a predetermined stop condition.

31. The computer according to claim 28, wherein remote operation history recording is stopped after a lapse of a predetermined time period from the start of remote operation history recording.

32. A computer to be remotely controlled by a distant control computer through a network, said computer comprising:
communication control means for receiving a remote operation message relating to software being executed by the computer from the distant control computer through the network;
remote operation basic control means for extracting remote operation information from the received remote operation message which is input into an operating system of said computer to cause the software being executed by the computer to perform a particular function; and
history recording means for creating a remote control history file at said computer being remotely controlled by the distant control computer in response to the received remote operation message having been input to the operating system, said remote control history file including the extracted remote operation information and information supplied from the operating system to an application program.

33. The computer according to claim 32, wherein said remote operation basic control means generates a message for reflecting the change in a computer screen in response to the remote operation input information to said distant computer, and sends the generated message to the network via said communication control means.

34. The computer according to claim 32, wherein the history recording means includes means for automatically starting remote operation history recording when it is judged that remote operation input information from the distant control computer or a computer operation in response to the remote operation input information satisfies a predetermined start condition.

35. The computer according to claim 32, wherein the history recording means includes means for automatically stopping remote operation history recording when it is judged that remote operation input information from the distant control computer or a computer operation in response to the remote operation input information satisfies a predetermined stop condition.

36. A computer to be remotely controlled by a distant control computer through a network, said computer comprising:
communication control means for receiving a remote operation message relating to software being executed by the computer from the distant computer through the network;
remote operation basic control means for extracting remote operation information from the received remote operation message which is input into an operating system of said computer to cause the software being executed by the computer to perform a particular function;
hooking means for capturing information supplied from the operating system to the software; and
history recording means for creating event data at said computer being remotely controlled by the distant control computer in response to the received remote operation message having been input to the operating system, said event data including the remote operation information and the information captured by the hooking means and for recording the created event data in a remote control history file.

37. The computer according to claim 36, wherein said remote operation basic control means generates a message for reflecting the change in a computer screen in response to the remote operation input information to said distant computer, and sends the generated message to the network via said communication control means.

38. The computer according to claim 36, wherein the history recording means includes means for automatically starting remote operation history recording when it is judged that remote operation input information from the distant control computer or a computer operation in response to the remote operation input information satisfies a predetermined start condition.

39. The computer according to claim 36, wherein the history recording means includes means for automatically stopping remote operation history recording when it is judged that remote operation input information from the distant control computer or a computer operation in response to the remote operation input information satisfies a predetermined stop condition.

40. A remote operation history recording method for use in a computer network system in which one of a plurality of computers is used as a control computer for conducting remote control operation of another computer which is used as a remote controlled computer, the method comprising the steps of:
    sending a remote operation message relating to software being executed by the remote controlled computer from said control computer to said remote controlled computer;
    extracting remote operation information from the remote operation message received by the remote controlled computer, and causing the software to perform a particular function the remote controlled computer according to the remote operation message upon input of the remote operation message into an operating system of said remote controlled computer;
    storing, as operation history data, the extracted remote operation information and event information generated according to the remote operation message at the remote controlled computer;
    sending a message indicating the results of execution of the program operation from the remote controlled computer to the control computer; and
    storing, as operation history data, event information indicating the results of the program operation at the remote controlled computer.

41. The remote operation history recording method according to claim 40, wherein the remote controlled computer judges whether or not the remote operation input information extracted from the remote operation message received from the control computer or a program operation executed in response to the remote operation input information satisfies a predetermined start condition, and if the predetermined start condition is satisfied, remote operation history recording is started at the remote controlled computer to store event information based on the remote operation input information and event information indicating the results of execution of the program operation.

42. A computer to be remotely controlled by a distant control computer through a network, said computer comprising:
    means for receiving a remote operation message relating to software being executed by the computer relating to software being executed by the computer from the distant control computer through the network;
    means for extracting remote operation information from the received remote operation message which is input into an operating system of said computer to cause the software being executed by the computer to perform a particular function;
    history recording means for recording in a memory the extracted remote operation information as remote control history data at the computer being remotely controlled by the distant control computer; and
    means for displaying remote control history information on a display screen of the computer being remotely controlled by the distant control computer based on the remote control history data recorded in the memory according to a request from a computer user.

43. The computer according to claim 42, wherein history recording means records in said memory, as a part of the remote control history data, transition of display which has occurred on said computer display screen in response to processing the remote operation input information.

44. The computer according to claim 42, wherein the history recording means includes means for automatically starting remote operation history recording when it is judged that remote operation input information from the distant control computer or a computer operation in response to the remote operation input information satisfies a predetermined start condition.

45. The computer according to claim 42, wherein the history recording means includes means for automatically stopping remote operation history recording when it is judged that remote operation input information from the distant control computer or a computer operation in response to the remote operation input information satisfies a predetermined stop condition.

46. The computer according to claim 42, wherein remote operation history recording is stopped after a lapse of a predetermined time period from the start of remote operation history recording.

47. A computer to be remotely controlled by a distant control computer through a network said computer comprising:
    communication control means for receiving a remote operation message relating to software being executed by the computer from the distant control computer through the network;
    remote operation basic control means for extracting remote operation information from the received remote operation message which is input into an operating system of said computer to cause the software being executed by the computer to perform a particular function;
    history recording means for creating a remote control history file at the computer being remotely controlled by the distant control computer in response to the received remote operation message having been input to the operating system, said remote control history file including the remote operation information and information supplied from the operating system to an application program; and
    means for displaying remote control history information on a display screen of the computer based on the contents of said remote control history file according to a request from a computer user.

48. The computer according to claim 47, wherein said remote operation basic control means generates a message for reflecting the change in a computer screen in response to the remote operation input information to said distant computer, and sends the generated message to the network via said communication control means.

49. The computer according to claim 47, wherein the history recording means includes means for automatically starting remote operation history recording when it is judged that remote operation input information from the distant control computer or a computer operation in response to the remote operation input information satisfies a predetermined start condition.

50. The computer according to claim 47, wherein the history recording means includes means for automatically stopping remote operation history recording when it is judged that remote operation input information from the distant control computer or a computer operation in response to the remote operation input information satisfies a predetermined stop condition.

51. A computer to be remotely controlled by a distant control computer through a communication network said computer comprising:

communication control means for receiving a remote operation message relating to software being executed by the computer from the distant control computer through the network;

remote operation basic control means for extracting remote operation information from the received remote operation message which is input into an operating system of said computer to cause the software being executed by the computer to perform a particular function;

hooking means for capturing information supplied from the operating system to the software;

history recording means for creating event data including the extracted remote operation input information and the information captured by the hooking means in response to the received remote operation message having been input to the operating system and for recording the created event data in a remote control history file at the computer being remotely controlled by the distant control computer; and means for displaying remote control history information on a display screen of the computer being remotely controlled by the distant control computer based on the contents of said remote control history file according to a request from a computer user.

52. The computer according to claim 51, wherein said remote operation basic control means generates a message for reflecting the change in a computer screen in response to the remote operation input information to said distant computer, and sends the generated message to the network via said communication control means.

53. The computer according to claim 51, wherein the history recording means includes means for automatically starting remote operation history recording when it is judged that remote operation input information from the distant control computer or a computer operation in response to the remote operation input information satisfies a predetermined start condition.

54. The computer according to claim 51, wherein the history recording means includes means for automatically stopping remote operation history recording when it is judged that remote operation input information from the distant control computer or a computer operation in response to the remote operation input information satisfies a predetermined stop condition.

* * * * *